(12) United States Patent
Ikarashi et al.

(10) Patent No.: US 12,079,363 B2
(45) Date of Patent: Sep. 3, 2024

(54) SECURE JOINING INFORMATION GENERATION SYSTEM, SECURE JOINING SYSTEM, METHODS THEREFOR, SECURE COMPUTING APPARATUS AND PROGRAM

(71) Applicant: NIPPON TELEGRAPH AND TELEPHONE CORPORATION, Tokyo (JP)

(72) Inventors: Dai Ikarashi, Musashino (JP); Koki Hamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 783 days.

(21) Appl. No.: 17/267,808

(22) PCT Filed: Aug. 8, 2019

(86) PCT No.: PCT/JP2019/031477
§ 371 (c)(1),
(2) Date: Feb. 11, 2021

(87) PCT Pub. No.: WO2020/036127
PCT Pub. Date: Feb. 20, 2020

(65) Prior Publication Data
US 2021/0182419 A1 Jun. 17, 2021

(30) Foreign Application Priority Data
Aug. 13, 2018 (JP) .................................. 2018-152413

(51) Int. Cl.
*G06F 7/36* (2006.01)
*G06F 7/24* (2006.01)
(Continued)

(52) U.S. Cl.
CPC ............ *G06F 21/6227* (2013.01); *G06F 7/24* (2013.01); *G06F 7/36* (2013.01); *G06F 7/724* (2013.01);
(Continued)

(58) Field of Classification Search
CPC ... G06F 7/36; G06F 7/724; G06F 7/76; G06F 17/16; G06F 40/177; G09G 1/00; H04L 2209/46; H04L 9/085
(Continued)

(56) References Cited

U.S. PATENT DOCUMENTS
2019/0228010 A1  7/2019 Karashi et al.

FOREIGN PATENT DOCUMENTS
WO  2018/061800 A1  4/2018

OTHER PUBLICATIONS

Kiribuchi et al., "An Efficient Equi-Join Algorithm for Secure Computation and Its Implementation Toward Secure Comprehensive Analyses of Users' Attribute and History Information", NTT Secure Platform Laboratories, CSS2016, 14 pages (7 pages of English Translation).

*Primary Examiner* — Tan V Mai
(74) *Attorney, Agent, or Firm* — XSENSUS LLP

(57) ABSTRACT

A secure joining system is a secure joining system including a plurality of secure computing apparatuses. The plurality of secure computing apparatuses include a vector joining unit $11_n$, a first vector generation unit $12_n$, a first permutation calculation unit $13_n$, a first permutation application unit $14_n$, a second vector generation unit $15_n$, a third vector generation unit $16_n$, a second permutation calculation unit $17_n$, a second permutation application unit $18_n$, a fourth vector generation unit $19_n$, a fifth vector generation unit $110_n$, a first inverse permutation application unit $111_n$, a first vector separation unit $112_n$, a second inverse permutation application unit
(Continued)

$113_n$, and a second vector separation unit $114_n$, a third permutation application unit $115_n$, a fourth permutation application unit $116_n$, and a first joined table generation unit $117_n$.

11 Claims, 6 Drawing Sheets

(51) Int. Cl.
*G06F 7/72* (2006.01)
*G06F 7/76* (2006.01)
*G06F 17/16* (2006.01)
*G06F 21/62* (2013.01)
*G06F 40/177* (2020.01)

(52) U.S. Cl.
CPC ............... *G06F 7/76* (2013.01); *G06F 17/16* (2013.01); *G06F 40/177* (2020.01)

(58) Field of Classification Search
USPC .......................................................... 708/200
See application file for complete search history.

US 12,079,363 B2

SECURE JOINING INFORMATION GENERATION SYSTEM, SECURE JOINING SYSTEM, METHODS THEREFOR, SECURE COMPUTING APPARATUS AND PROGRAM

CROSS-REFERENCE TO RELATED APPLICATIONS

The present application is based on PCT filing PCT/JP2019/031477, filed Aug. 8, 2019, which claims priority to JP 2018-152413, filed Aug. 13, 2018, the entire contents of each are incorporated herein by reference.

TECHNICAL FIELD

The present invention relates to secure computation techniques. In particular, it relates to techniques for joining two tables while maintaining confidentiality.

BACKGROUND ART

In the field of secure computation techniques, there is a demand for a technique for joining two tables while maintaining confidentiality.

For example, a technique described in Non-patent Literature 1 is known as a technique for joining two tables while maintaining confidentiality. Non-patent Literature 1 has realized equi-join in a case with key overlap.

PRIOR ART LITERATURE

Non-Patent Literature

Non-Patent Literature 1: Naoto Kiribuchi, Dai Ikarashi, Gembu Morohashi, and Koki Hamada, "An Efficient Equi-Join Algorithm for Secure Computation and Its Implementation Toward Secure Comprehensive Analyses of Users' Attribute and History Information",

SUMMARY OF THE INVENTION

Problems to be Solved by the Invention

The present invention provides a secure joining information generation system, a secure joining system, methods therefor, a secure computing apparatus, and a program for generating information necessary to join two tables while maintaining confidentiality in a case with no key overlap more rapidly than the technique of Non-patent Literature 1.

Means to Solve the Problems

A secure joining information generation system according to an aspect of the present invention is a secure joining information generation system including a plurality of secure computing apparatuses, where $F_k$ and $F_v$ are arbitrary rings; $[\alpha]$ is a share generated by secret sharing of $\alpha$, with $\alpha$ being an arbitrary vector or arbitrary permutation; $m_0$ and $m_1$ are integers greater than or equal to 1; $k_0 \in F_k^{m_0}$ is a vector of a key of a first table; $V_0 \in F_v^{m_0}$ is a vector of an attribute value of the first table; $k_1 \in F_k^{m_1}$ is a vector of a key of a second table; $v_1 \in F_v^{m_1}$ is a vector of an attribute value of the second table; and $\pi_0$ and $\pi_1$ are predetermined permutations with lengths of $m_0$ and $m_1$, respectively. The plurality of secure computing apparatuses include: a plurality of vector joining units that use a share $[k_0]$ of the vector $k_0$ and a share $[k_1]$ of the vector $k_1$ to generate a share $[k]$ of a vector $k \in [F_k]^{m_0+m_1}$ which is generated by joining the vector $k_0$ and the vector $k_1$; a plurality of first vector generation units that generate a share $[f]$ of a vector $f$ which is generated by joining $m_0$ 0's and $m_1$ 1's; a plurality of first permutation calculation units that use the share $[k]$ to generate a share $[\sigma]$ of a permutation $\sigma$ for stable sorting of the vector $k$; a plurality of first permutation application units that use the share $[k]$, the share $[\sigma]$, and the share $[f]$ to generate a share $[\sigma(k)]$ of a vector $\sigma(k)$ which is generated by application of the permutation $\sigma$ to the vector $k$ and a share $[\sigma(f)]$ of a vector $\sigma(f)$ which is generated by application of the permutation $\sigma$ to the vector $f$; a plurality of second vector generation units that use the share $[\sigma(k)]$ to generate a share $[e]$ of a vector $e$ which has 1 when a certain element of the vector $\sigma(k)$ and an element following that element are the same and has 0 when they are different as an element corresponding to that element; a plurality of third vector generation units that use the share $[e]$ to generate a share $[e']$ of a vector $e'$, which is generated by bit inversion of each element of a vector which has 1 when one of a certain element of the vector $e$ and an element preceding that element is 1 and has 0 otherwise as an element corresponding to that element; a plurality of second permutation calculation units that use the share $[e']$ to generate a share $[\sigma']$ of a permutation $\sigma'$ for stable sorting of the vector $e'$; a plurality of second permutation application units that use the share $[\sigma(f)]$ and the share $[\sigma']$ to generate a share $[f']$ of a vector $f'=\sigma'(\sigma(f))$ which is generated by application of the permutation $\sigma'$ to the vector $\sigma(f)$; a plurality of fourth vector generation units that use the share $[f']$ to generate a share $[s]$ of a vector $s$, each element of which is a sum of elements of the vector $f'$ up to an element corresponding to that element, the elements including the element corresponding to that element, and a share $[s']$ of a vector $s'$, each element of which is a sum of elements of a bit-inverted vector up to an element corresponding to that element, the elements including the element corresponding to that element, where the bit-inverted vector is a vector generated by bit inversion of each element of the vector $f'$; a plurality of fifth vector generation units that use the share $[f']$, the share $[s]$, and the share $[s']$ to calculate a share $[\sigma'']$ of a vector $\sigma''=f's+(1-f')s'-1$; a plurality of first inverse permutation application units that use the share $[e']$ and the share $[\sigma]$ to generate a share $[e'']$ of a vector $e''=\sigma^{-1}(e')$ which is generated by application of an inverse permutation $\sigma^{-1}$ of the permutation $\sigma$ to the vector $e'$; a plurality of first vector separation units that use the share $[e'']$ to generate a share $[g_0]$ of a vector $g_0$ which is formed from first $m_0$ elements of the vector $e''$ and a share $[g_1]$ of a vector $g_1$ which is formed from remaining $m_1$ elements of the vector $e''$; a plurality of second inverse permutation application units that use the share $[\sigma'']$, the share $[\sigma]$, and the share $[\sigma']$ to generate a share $[\sigma'''^{-1}]$ of a vector $\sigma'''^{-1}=\sigma^{-1}(\sigma'^{-1}(\sigma''))$ which is generated by application of an inverse permutation $\sigma'^{-1}$ of the permutation $\sigma'$ and the inverse permutation $\sigma^{-1}$ of the permutation $\sigma$ to the vector $x$; a plurality of second vector separation units that use the share $[\sigma'''^{-1}]$ to generate a share $[\sigma_0^{-1}]$ of a vector $\sigma_0^{-1}$ which is formed from first $m_0$ elements of the vector $\sigma'''^{-1}$ and a share $[\sigma_1^{-1}]$ of a vector $\sigma_1^{-1}$ which is formed from remaining $m_1$ elements of the vector $\sigma'''^{-1}$; and a plurality of third permutation application units that use the share $[\sigma_0^{-1}]$, the share $[\sigma_1^{-1}]$, a share $[\pi_0]$ of the permutation $\pi_0$, and a share $[\pi_1]$ of the permutation $\pi_1$ to generate a share $[\pi_0(\sigma_0^{-1})]$ of a vector $\pi_0(\sigma_0^{-1})$ which is generated by application of the permutation $\pi_0$ to the vector $\sigma_0^{-1}$ and a share $[\pi_1(\sigma_1^{-1})]$ of a vector $\pi_1(\sigma_1^{-1})$ which is generated by application of the permutation $\pi_1$ to the vector $\sigma_1^{-1}$, and release the $\pi_0(\sigma_0^{-1})$ and the $\pi_1(\sigma_1^{-1})$).

A secure joining system according to an aspect of the present invention includes the plurality of secure computing apparatuses of the secure joining information generation system described above. The plurality of secure computing apparatuses further include: a plurality of fourth permutation application units that use the share $[k_0]$ of the vector $k_0$, a share $[v_0]$ of the vector $v_0$, the share $[k_1]$ of the vector $k_1$, and a share $[v_1]$ of the vector $v_1$ to calculate a share $[k_0']$ of a vector $k_0'=(\pi_0(\sigma_0^{-1}))^{-1}(\pi_0(k_0))$, a share $[v_0']$ of a vector $v_0'=(\pi_0(\sigma_0^{-1}))^{-1}(\pi_0(v_0))$, a share $[k_1']$ of a vector $k_1'=(\pi_1(\sigma_1^{-1}))^{-1}(\pi_1(k_1'))$, and a share $[v_1']$ of a vector $v_1'=(\pi_1(\sigma_1^{-1}))^{-1}(\pi_1(v_1'))$; and a plurality of first joined table generation units that use the share $[k_0']$, the share $[v_0']$, the share $[k_1']$, and the share $[v_1']$ to generate a joined table which joins a vector generated by extracting first c elements of the vector $k_0'$, a vector generated by extracting first c elements of the vector $v_0'$, a vector generated by extracting first c elements of the vector $k_1'$, and a vector generated by extracting first c elements of the vector $v_1'$, where c is the number of 0 elements in the vector $g_0$ or the vector $g_1$.

A secure joining system according to an aspect of the present invention is a secure joining system including a plurality of secure computing apparatuses, where $F_k$ and $F_v$ are arbitrary rings; $[\alpha]$ is a share generated by secret sharing of $\alpha$, with $\alpha$ being an arbitrary vector or arbitrary permutation; $m_0$ and $m_1$ are integers greater than or equal to 1; $k_0 \in F_k^{m0}$ is a vector of a key of a first table; $v_0 \in F_v^{m0}$ is a vector of an attribute value of the first table; $k_1 \in F_k^{m1}$ is a vector of a key of a second table; $v_1 \in F_v^{m1}$ is a vector of an attribute value of the second table; and $\pi_0$ and $\pi_1$ are predetermined permutations with lengths of $m_0$ and $m_1$, respectively. The plurality of secure computing apparatuses include: a plurality of secure joining information generation units that use a share $[k_0]$ of the vector $k_0$, a share $[k_1]$ of the vector $k_1$, a share $[\pi_0]$ of the permutation $\pi_0$, and a share $[\pi_1]$ of the permutation $\pi_1$ to generate a share $[\pi_0(\sigma_0^{-1})]$ of a vector $\pi_0(\sigma_0^{-1})$ which is generated by application of the permutation $\pi_0$ to an inverse permutation $\sigma_0^{-1}$ of a permutation $\sigma_0$, where permutation of each vector of the first table with the permutation $\sigma_0$ causes records for keys common to the first table and the second table to move to a head side, a share $[\pi_1(\sigma_1^{-1})]$ of a vector $\pi_1(\sigma_1^{-1})$ which is generated by application of the permutation $\pi_1$ to an inverse permutation $\sigma_1^{-1}$ of a permutation $\sigma_1$, where permutation of each vector of the second table with the permutation $\sigma_1$ causes records for keys common to the first table and the second table to move to the head side, a share $[g_0]$ of a vector $g_0$ which is formed from a value $g_{0,i}$ indicating whether the ith record of the first table is a record for a key that is common to the first table and the second table, and a share $[g_1]$ of a vector $g_1$ which is formed from a value $g_{1,i}$ indicating whether the ith record of the second table is a record for a key that is common to the first table and the second table; a plurality of filtering units that use the share $[g_1]$, the share $[k_1]$ of the vector $k_1$, and the share $[v_1]$ of the vector $v_1$ to generate a modified second table in which if $g_{1,i}=1$, the ith element of the key of the second table is set to a predefined value $u_{1,k}$ indicating null and the ith element of the attribute of the second table is set to a predefined value $u_{1,v}$ indicating null, where $g_{1,i}$ is the ith element of the vector $g_1$; a plurality of fifth permutation application units that use the share $[k_0]$ of the vector $k_0$, a share $[v_0]$ of the vector $v_0$, a share $[k_1']$ of $k_1'$, which is a vector of the key of the modified second table, a share $[v_1']$ of $v_1'$, which is a vector of the attribute value of the modified second table, the share $[\pi_0]$ of the permutation $\pi_0$, the share $[\pi_1]$ of the permutation $\pi_1$, the share $[\pi_0(\sigma_0^{-1})]$, and the share $[\pi_1(\sigma_1^{-1})]$ to calculate a share $[k_0']$ of a vector $k_0'=(\pi_0(\sigma_0^{-1}))^{-1}(\pi_0(k_0))$, a share $[v_0']$ of a vector $v_0'=(\pi_0(\sigma_0^{-1}))^{-1}(\pi_0(v_0))$, a share $[k_1'']$ of a vector $k_1''=(\pi_1(\sigma_1^{-1}))^{-1}(\pi_1(k_1'))$, and a share $[v_1'']$ of a vector $v_1''=(\pi_1(\sigma_1^{-1}))^{-1}(\pi_1(v_1'))$; and a plurality of second joined table generation units that use the share $[k_0']$, the share $[v_0']$, the share $[k_1'']$, and the share $[v_1'']$ to generate, when $m_0<m_1$, a joined table which joins the vector $k_0'$, the vector $v_0'$, a vector generated by extracting first $m_0$ elements of the vector $k_1''$, and a vector generated by extracting first $m_0$ elements of the vector $v_1''$, and to generate, when $m_0>m_1$, a joined table which joins the vector $k_0'$, the vector $v_0'$, a vector generated by adding $m_0-m_1$ elements being a predefined value $u_k$ indicating null to the vector $k_1''$, and a vector generated by adding $m_0-m_1$ elements being a predefined value $u_v$ indicating null to the vector $v_1''$.

A secure joining system according to an aspect of the present invention is a secure joining system including a plurality of secure computing apparatuses, where $F_k$ and $F_v$ are arbitrary rings; $[\alpha]$ is a share generated by secret sharing of $\alpha$, with $\alpha$ being an arbitrary vector or arbitrary permutation; $m_0$ and $m_1$ are integers greater than or equal to 1; $k_0 \in F_k^{m0}$ is a vector of a key of a first table; $v_0 \in F_v^{m0}$ is a vector of an attribute value of the first table; $k_1 \in F_k^{m1}$ is a vector of a key of a second table; $v_1 \in F_v^{m1}$ is a vector of an attribute value of the second table; and $\pi_0$ and $\pi_1$ are predetermined permutations with lengths of $m_0$ and $m_1$, respectively. The plurality of secure computing apparatuses include: a plurality of secure joining information generation units that use a share $[k_0]$ of the vector $k_0$, a share $[k_1]$ of the vector $k_1$, a share $[\pi_0]$ of the permutation $\pi_0$, and a share $[\pi_1]$ of the permutation $\pi_1$ to generate a share $[\pi_0(\sigma_0^{-1})]$ of a vector $\pi_0(\sigma_0^{-1})$ which is generated by application of the permutation $\pi_0$ to an inverse permutation $\sigma_0^{-1}$ of a permutation $\sigma_0$, where permutation of each vector of the first table with the permutation $\sigma_0$ causes records for keys common to the first table and the second table to move to a head side, a share $[\pi_1(\sigma_1^{-1})]$ of a vector $\pi_1(\sigma_1^{-1})$ which is generated by application of the permutation $\pi_1$ to an inverse permutation $\sigma_1^{-1}$ of a permutation $\sigma_1$, where permutation of each vector of the second table with the permutation $\sigma_1$ causes records for keys common to the first table and the second table to move to the head side, a share $[g_0]$ of a vector $g_0$ which is formed from a value $g_{0,i}$ indicating whether the ith record of the first table is a record for a key that is common to the first table and the second table, and a share $[g_1]$ of a vector $g_1$ which is formed from a value $g_{1,i}$ indicating whether the ith record of the second table is a record for a key that is common to the first table and the second table; a plurality of fourth permutation application units that use the share $[k_0]$ of the vector $k_0$, a share $[v_0]$ of the vector $v_0$, the share $[k_1]$ of the vector $k_1$, and a share $[v_1]$ of the vector $v_1$ to calculate a share $[k_0']$ of a vector $k_0'=(\pi_0(\sigma_0^{-1}))^{-1}(\pi_0(k_0))$, a share $[v_0']$ of a vector $v_0'=(\pi_0(\sigma_0^{-1}))^{-1}(\pi_0(v_0))$, a share $[k_1']$ of a vector $k_1'=(\pi_1(\sigma_1^{-1}))^{-1}(\pi_1(k_1'))$, and a share $[v_1']$ of a vector $v_1'=(\pi_1(\sigma_1^{-1}))^{-1}(\pi_1(v_1'))$; and a plurality of third joined table generation units that use the share $[k_0']$, the share $[v_0']$, the share $[k_1']$, and the share $[v_1']$ to generate a joined table which joins a table (1) which joins a vector generated by extracting first c elements of the vector $k_0'$, a vector generated by extracting first c elements of the vector $v_0'$, a vector generated by extracting first c elements of the vector $k_1'$, and a vector generated by extracting first c elements of the vector $v_1'$, a table (2) which joins a vector generated by extracting remaining $m_0$-c elements of the vector $k_0'$, a vector generated by extracting remaining $m_0$-c elements of the vector $v_0'$, and a vector having a value corresponding to the attribute value of the second table set to a predefined value $u'_{1,v}$ indicating null, and a table (3) which joins a vector generated by extracting remaining $m_0$-c elements of the vector $v_0'$, a vector generated by extracting remaining $m_1$-c elements of the vector $v_1'$, and a vector having a value corresponding to the attribute value of the first table set to a predefined value $u'_{0,v}$ indicating null, where c is the number of 0 elements in the vector $g_0$ or the vector $g_1$.

Effects of the Invention

Use of inverse permutation makes it possible to generate information necessary to join two tables while maintaining confidentiality in a case with no key overlap more rapidly than the technique of Non-patent Literature 1. In turn, using the information, two tables can be joined while maintaining confidentiality in a case with no key overlap more rapidly than the technique of Non-patent Literature 1.

DETAILED DESCRIPTION OF THE EMBODIMENTS

Figure 1:
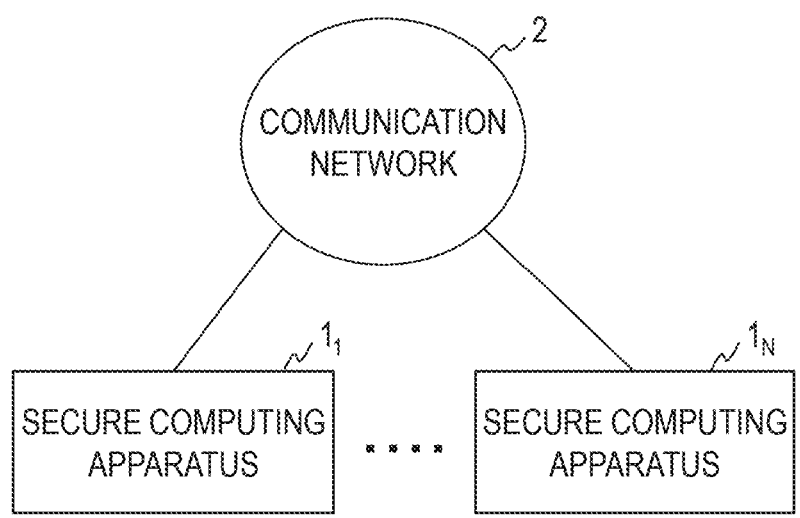
FIG. 1 illustrates a functional configuration of a secure joining system.

Embodiments of the present invention are described below in detail. In the drawings, components having the same function are given the same reference characters and overlapping description is omitted.

Secure Joining System and Method for Performing Inner Join

Referring to FIG. 1, an exemplary configuration of a secure joining system according to an embodiment is described. This secure joining system and method performs so-called inner join. That is, this secure joining system joins records that are common to a first table and a second table while maintaining confidentiality.

The secure joining system includes N (≥2) secure computing apparatuses $1_1, \ldots, 1_N$. In this embodiment, the secure computing apparatuses $1_1, \ldots, 1_N$ are each connected to a communication network 2. The communication network 2 is a circuit-switched or packet-switched communication network configured to allow communications between connected apparatuses, and can be the Internet, a local area network (LAN), a wide area network (WAN), and the like, for example. The apparatuses do not necessarily be capable of communicating online via the communication network 2. For example, they may be configured such that information entered to the secure computing apparatuses $1_1, \ldots, 1_N$ is stored in a portable recording medium such as magnetic tape or a USB memory and the information is entered offline to the secure computing apparatuses $1_1, \ldots, 1_N$ from the portable recording medium.

Figure 2:
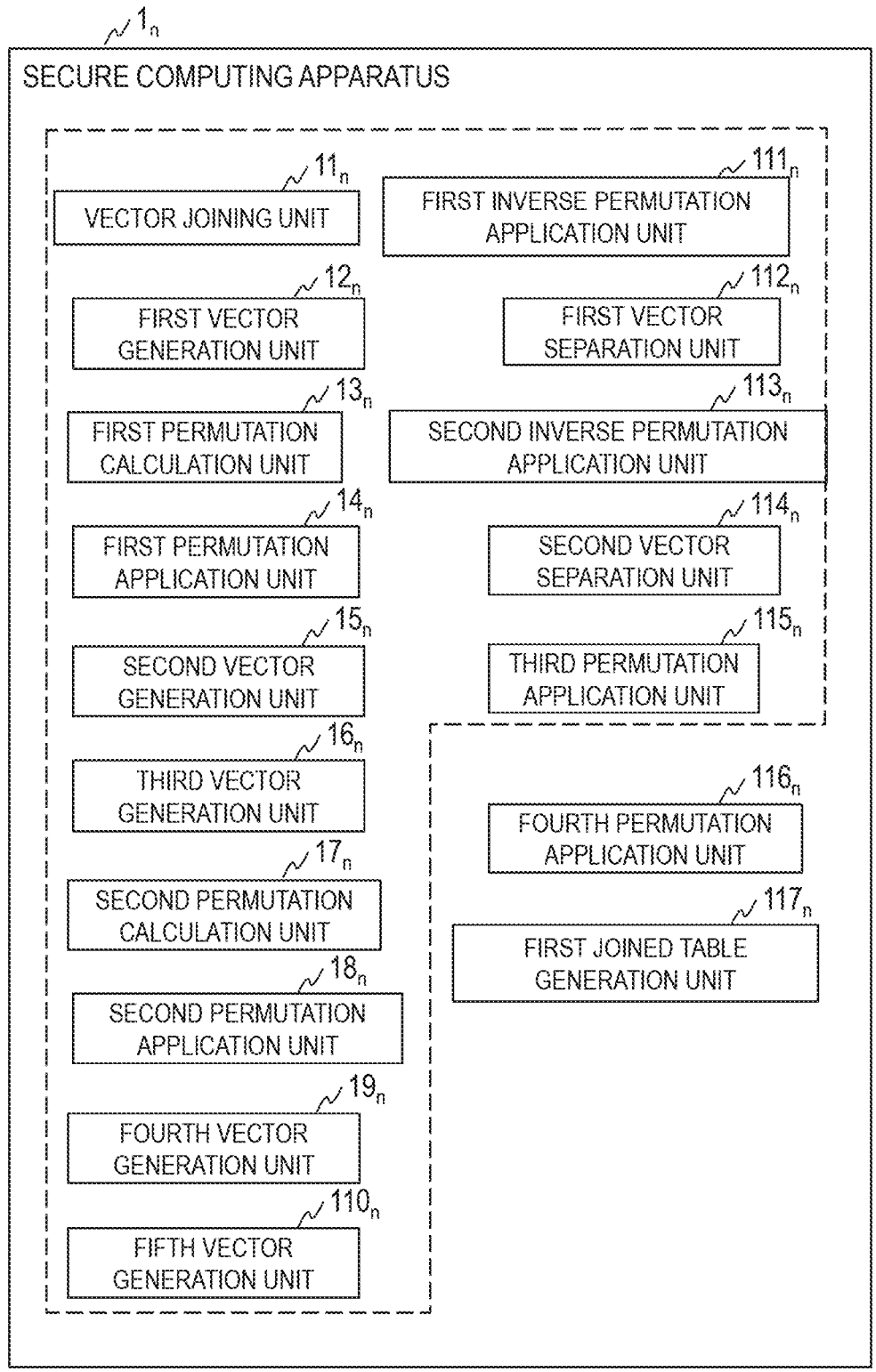
FIG. 2 illustrates a functional configuration of a secure computing apparatus of a secure joining system for performing inner join.

Referring to FIG. 2, an exemplary configuration of a secure computing apparatus $1_n$ (n=1, ..., N) included in the secure joining system is described. As shown in FIG. 2, the secure computing apparatus $1_n$ of the secure joining system includes a vector joining unit $11_n$, a first vector generation unit $12_n$, a first permutation calculation unit $13_n$, a first permutation application unit $14_n$, a second vector generation unit $15_n$, a third vector generation unit $16_n$, a second permutation calculation unit $17_n$, a second permutation application unit $18_n$, a fourth vector generation unit $19_n$, a fifth vector generation unit $110_n$, a first inverse permutation application unit $111_n$, a first vector separation unit $112_n$, a second inverse permutation application unit $113_n$, a second vector separation unit $114_n$, a third permutation application unit $115_n$, a fourth permutation application unit $116_n$, and a first joined table generation unit $117_n$, for example.

By the components of the secure computing apparatus $1_n$ (1≤n≤N) performing processing at each step described later in cooperation with the components of other secure computing apparatus $1_{n'}$ (n'=1, ..., N; where n≠n'), the secure joining method according to the embodiment is implemented.

The processing at each step is performed in secure computation. That is, the secure computing apparatus $1_n$ performs the processing at each step without reconstructing a share, in other words, without knowing the content of the share.

The secure computing apparatus $1_n$ is a special apparatus configured by loading of a special program into a well-known or dedicated computer having a central processing unit (CPU), main storage unit (random access memory: RAM), and the like, for example. The secure computing apparatus $1_n$ executes various kinds of processing under control of the central processing unit, for example. Data input to the secure computing apparatus $1_n$ and data resulting from processing are stored in the main storage unit, for example, and the data stored in the main storage unit is read into the central processing unit as necessary to be used for other processing. The components of the secure computing apparatus $1_n$ may at least partially consist of hardware such as an integrated circuit.

For the following description, [α] is assumed to be a share generated by secret sharing of α, with α being an arbitrary vector or an arbitrary permutation.

Figure 3:
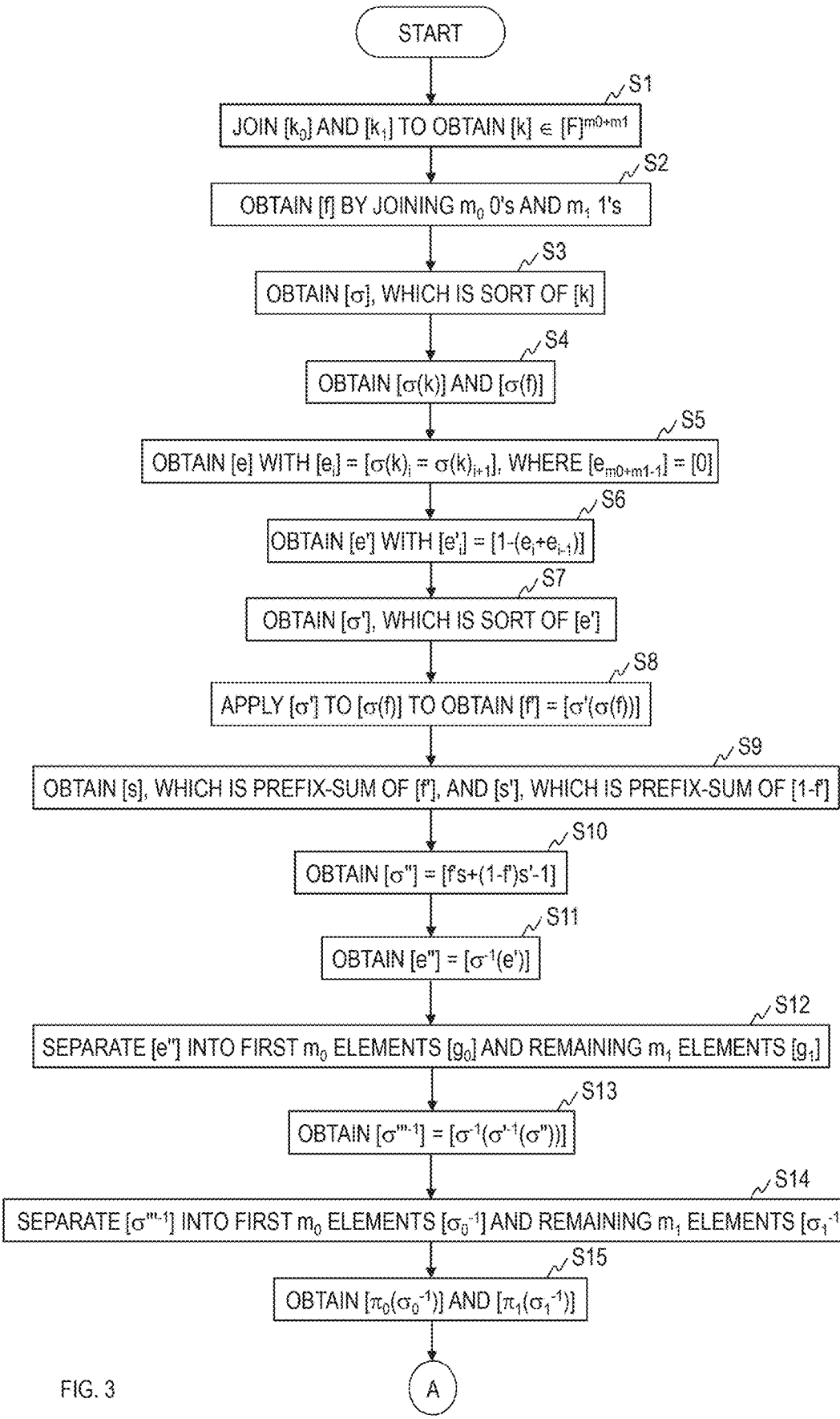
FIG. 3 illustrates a processing procedure of a secure joining method for performing inner join, a secure joining method for performing left outer join, and a secure joining method performing full outer join.
Figure 4:
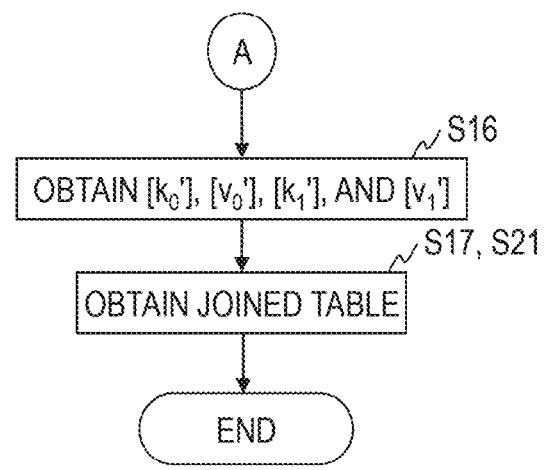
FIG. 4 illustrates a processing procedure of a secure joining method for performing inner join and a secure joining method for performing full outer join.
Figure 5:
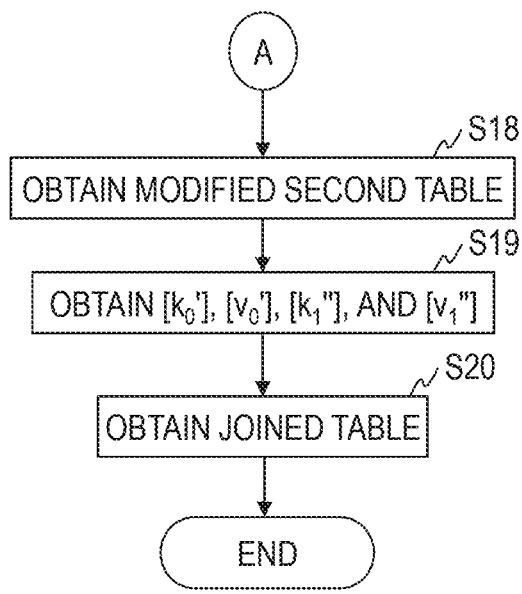
FIG. 5 illustrates a processing procedure of a secure joining method for performing left outer join.

Referring to FIGS. 3 and 4, the processing procedure of the secure joining method which is performed by the secure joining system in the embodiment is described.

For the following description, assume that $m_0$, $m_1$, $L_0$, and $L_1$ are integers greater than or equal to 1. $m_0$, $m_1$, $L_0$, and $L_1$ may be the same value or different values.

The first table has $m_0$ records. Each one of the $m_0$ records has one key and attribute values of $L_0$ attributes. Let $k_0 \in F_k^{m_0}$ be a vector of the keys of the first table. Let $v_0 \in F_v^{m_0}$ be a vector of the attribute values of each attribute of the first table. It is assumed that there are no overlapping keys in the first table. In a case where the first table contains the attribute values of multiple attributes, $v_0$ may be a vector which is a concatenation of the attribute values of the multiple attributes. For example, assume that the first table has two records and contains the attribute values of two attributes, where the vector of the attribute values of the first attribute is $v_{0,1}=(29, 169)$ and the vector of the attribute values of the second attribute is $v_{0,1}=(35, 175)$. In this case, $v_0$ may be the vector $v_0=((29, 35), (169, 175))$, which is a concatenation of the attribute values of these two attributes.

"m0" in the superscript to $[F_k, F_v]^{m0}$ means "$m_0$". In this manner, representation of a further superscript or subscript can be omitted in a superscript. Similarly, representation of a further superscript or subscript can be omitted in a subscript.

The second table has $m_1$ records. Each one of the $m_1$ records has one key and attribute values of $L_1$ attributes. Let $k_1 \in F_k^{m1}$ be a vector of the keys of the second table. Let $v_1 \in F_v^{m1}$ be a vector of the attribute values of each attribute of the second table. It is assumed that there are no overlapping keys in the second table. In a case where the second table contains the attribute values of multiple attributes, $v_1$ may be a vector which is a concatenation of the attribute values of the multiple attributes like $v_0$.

Since in general a vector with its elements being rings is also a ring, data formed by arranging the values of the respective attributes contained in a record can be considered to be a vector, that is, a ring.

For example, assume that the first table has three records and consists of a vector of keys, $k_0=(1, 2, 3)$, and a vector of the attribute values of one attribute, $v_0=(5, 10, 1)$.

Also assume that the second table has four records and consists of a vector of keys, $k_1=(1, 3, 4, 5)$, and a vector of the attribute values of one attribute, $v_1=(2, 4, 9, 8)$.

Step S1

A share $[k_0]$ of the vector $k_0$ and a share $[k_1]$ of the vector $k_1$ are input to the vector joining units $11_1, \ldots, 11_N$.

The vector joining units $11_1, \ldots, 11_N$ each join $[k_0]$ and $[k_1]$ to obtain $[k] \in [F_k]^{m0+m1}$.

More specifically, the vector joining units $11_1, \ldots, 11_N$ each use the share $[k_0]$ of the vector $k_0$ and the share $[k_1]$ of the vector $k_1$ to generate a share $[k]$ of a vector $k \in [F_k]^{m0+m1}$ which is generated by joining the vector $k_0$ and the vector $k_1$ (step S1).

The generated share $[k]$ is output to the first permutation calculation units $13_1, \ldots, 13_N$ and the first permutation application units $14_1, \ldots, 14_N$.

For example, assume that the vector $k_0=(1, 2, 3)$ and the vector $k_1=(1, 3, 4, 5)$ hold. In this case, the vector $k=(1, 2, 3, 1, 3, 4, 5)$ is yielded.

Step S2

The first vector generation units $12_1, \ldots, 12_N$ each generate a share $[f]$ of a vector $f$ which is generated by joining $m_0$ 0's and $m_1$ 1's (step S2).

The share $[f]$ is output to the first permutation application units $14_1, \ldots, 14_N$.

For example, the vector $f=(0, 0, 0, 1, 1, 1, 1)$ is yielded when $m_0=3$ and $m_1=4$.

Step S3

The share $[k]$ is input to the first permutation calculation units $13_1, \ldots, 13_N$.

The first permutation calculation units $13_1, \ldots, 13_N$ each use the share $[k]$ to generate a share $[\sigma]$ of a permutation $\sigma$ for stable sorting of the vector $k$ (step S3).

The share $[\sigma]$ is output to the first permutation application units $14_1, \ldots, 14_N$, the first inverse permutation application units $111_1 \ldots 111_N$ and the second inverse permutation application units $113_1, \ldots, 113_N$.

For example, when $k=(1, 2, 3, 1, 3, 4, 5)$, the permutation $\sigma$ will be as shown in Formula (1) below. For example, assuming that numbers are denoted starting at 1, each sequence $(i,j)^T$ of the permutation $\sigma$ means that the ith element of the vector to which the permutation is applied is moved to the jth element.

$$\sigma = \begin{pmatrix} 1 & 2 & 3 & 4 & 5 & 6 & 7 \\ 1 & 3 & 4 & 2 & 5 & 6 & 7 \end{pmatrix} \quad (1)$$

Stable sort refers to sorting in which the order of equal data before sorting is preserved after the sorting. Generation of the share $[\sigma]$ of the permutation $\sigma$ for performing a stable sort can be implemented with the approach of Reference Literature 1, for example.

[Reference Literature 1] Dai Ikarashi, Koki Hamada, Ryo Kikuchi, and Koji Chida, "A Design and an Implementation of Super-high-speed Multi-party Sorting: The Day When Multi-party Computation Reaches Scripting Languages", CSS2017, 2017

Step S4

The share $[k]$, the share $[\sigma]$, and the share $[f]$ are input to the first permutation application units $14_1, \ldots, 14_N$.

The first permutation application units $14_1, \ldots, 14_N$ each use the share $[k]$, the share $[\sigma]$, and the share $[f]$ to generate a share $[\sigma(k)]$ of a vector $\sigma(k)$ which is generated by application of the permutation $\sigma$ to the vector $k$ and a share $[\sigma(f)]$ of a vector $\sigma(f)$ which is generated by application of the permutation $\sigma$ to the vector $f$ (step S4).

The share $[\sigma(k)]$ is output to the second vector generation units $15_1, \ldots, 15_N$.

The share $[\sigma(f)]$ is output to the second permutation application units $18_k, \ldots, 18_N$.

For example, the vector $\sigma(k)=(1, 1, 2, 3, 3, 4, 5)$ and the vector $\sigma(f)=(0, 1, 0, 0, 1, 1, 1)$ are yielded when the vector $k=(1, 2, 3, 1, 3, 4, 5)$ and the vector $f=(0, 0, 0, 1, 1, 1, 1)$ hold and the permutation $\sigma$ is the permutation defined by the Formula (1) above.

Step S5

The share $[\sigma(k)]$ is input to the second vector generation units $15_1, \ldots, 15_N$.

The second vector generation units $15_1, \ldots, 15_N$ each use the share $[\sigma(k)]$ to generate a share $[e]$ of a vector e which has 1 when a certain element of the vector $\sigma(k)$ and the element following that element are the same and has 0 when they are different as the element corresponding to that element (step S5). Here, assume that $e_{n-1}=0$ holds.

The share $[e]$ is output to the third vector generation units $16_1, \ldots, 16_N$.

For example, the vector $e=(1, 0, 0, 1, 0, 0, 0)$ is yielded when the vector $\sigma(k)=(1, 1, 2, 3, 3, 4, 5)$.

Step S6

The share $[e]$ is input to the third vector generation units $16_1, \ldots, 16_N$.

The third vector generation units $16_1, \ldots, 16_N$ each use the share $[e]$ to generate a share $[e']$ of a vector $e'$, which is generated by bit inversion of each element of a vector which has 1 when one of a certain element of the vector e and the element preceding that element is 1 and has 0 otherwise as the element corresponding to that element (step S6).

The share [e'] is output to the second permutation calculation units $17_1, \ldots, 17_N$ and the first inverse permutation application units $111_1, \ldots, 111_N$.

For example, the vector e'=(0, 0, 1, 0, 0, 1, 1) is yielded when the vector e=(1, 0, 0, 1, 0, 0, 0).

Step S7

The share [e'] is input to the second permutation calculation units $17_1, \ldots, 17_N$.

The second permutation calculation units $17_1, \ldots, 17_N$ each use the share [e'] to generate a share [σ'] of a permutation σ' for stable sorting of the vector e' (step S7).

The share [σ'] is output to the second permutation application units $18_1, \ldots, 18_N$ and the second inverse permutation application units $113_1, \ldots, 113_N$.

For example, the permutation σ' will be as shown in Formula (2) below when the vector e'=(0, 0, 1, 0, 0, 1, 1).

$$\sigma' = \begin{pmatrix} 1 & 2 & 3 & 4 & 5 & 6 & 7 \\ 1 & 2 & 5 & 3 & 4 & 6 & 7 \end{pmatrix} \quad (2)$$

Step S8

The share [σ(f)] and the share [σ'] are input to the second permutation application units $18_1, \ldots, 18_N$.

The second permutation application units $18_1, \ldots, 18_N$ each use the share [σ(f)] and the share [σ'] to generate a share [f'] of a vector f'=σ'(σ(f)) which is generated by application of the permutation σ' to the vector σ(f) (step S8).

The share [f'] is output to the fourth vector generation units $19_1, \ldots, 19_N$ and the fifth vector generation units $110_1, \ldots, 110_N$.

For example, the vector f'=(0, 1, 0, 1, 0, 1, 1) is yielded when the vector σ(f)=(0, 1, 0, 0, 1, 1, 1) holds and the permutation σ' is the permutation defined by the Formula (2) above.

Step S9

The share [f'] is input to the fourth vector generation units $19_1, \ldots, 19_N$.

The fourth vector generation units $19_1, \ldots, 19_N$ each use the share [f'] to generate a share [s] of a vector s, each element of which is a sum of elements of the vector f' up to an element corresponding to that element, the elements including the element corresponding to that element, and a share [s'] of a vector s', each element of which is a sum of elements of a bit-inverted vector up to an element corresponding to that element, the elements including the element corresponding to that element, where the bit-inverted vector is a vector generated by bit inversion of each element of the vector f' (step S9).

The share [s] and the share [s'] are output to the fifth vector generation units $110_1, \ldots, 110_N$.

For example, the vector s=(0, 1, 1, 2, 2, 3, 4) and the vector s'=(1, 1, 2, 2, 3, 3, 3) are yielded when the vector f'=(0, 1, 0, 1, 0, 1, 1).

The share [f'], the share [s] and the share [s'] are input to the fifth vector generation units $110_1, \ldots, 110_N$.

The fifth vector generation units $110_1, \ldots, 110_N$ each use the share [f'], the share [s], and the share [s'] to calculate a share [σ''] of a vector σ''=f's+(1−f')s'−1 (step S10).

The share [σ''] is output to the second inverse permutation application units $113_1, \ldots, 113_N$.

For example, σ''=(0, 0, 1, 1, 2, 2, 3) is yielded when the vector s=(0, 1, 1, 2, 2, 3, 4) and the vector s'=(1, 1, 2, 2, 3, 3, 3).

Step S11

The share [e'] and the share [σ] are input to the first inverse permutation application units $111_1, \ldots, 111_N$.

The first inverse permutation application units $111_1, \ldots, 111_N$ each use the share [e'] and the share [σ] to generate a share [e''] of a vector e''=σ⁻¹(e') which is generated by application of an inverse permutation σ⁻¹ of the permutation σ to the vector e' (step S11).

The share [e''] is output to the first vector separation units $112_1, \ldots, 112_N$.

For example, the vector e''=(0, 1, 0, 0, 0, 1, 1) is yielded when the vector e'=(0, 0, 1, 0, 0, 1, 1) holds and the permutation σ is the permutation of the Formula (1) above.

Step S12

The share [e''] is input to the first vector separation units $112_k, \ldots, 112_N$.

The first vector separation units $112_k, \ldots, 112_N$ each use the share [e''] to generate a share [$g_0$] of a vector $g_0$ which is formed from the first $m_0$ elements of the vector e'' and a share [$g_1$] of a vector $g_1$ which is formed from the remaining $m_1$ elements of the vector e'' (step S12).

The share [$g_1$] is output.

For example, the vector $g_0$=(0, 1, 0) and the vector $g_1$=(0, 0, 1, 1) are yielded when the vector e''=(0, 1, 0, 0, 0, 1, 1).

Step S13

The share [σ''], the share [σ] and the share [σ'] are input to the second inverse permutation application units $113_1, \ldots, 113_N$.

The second inverse permutation application units $113_1, \ldots, 113_N$ each use the share [σ''], the share [σ], and the share [σ'] to generate a share [σ'''⁻¹] of a vector σ'''⁻¹=σ⁻¹(σ'⁻¹(σ'')) which is generated by application of an inverse permutation σ'⁻¹ of the permutation σ' and the inverse permutation σ⁻¹ of the permutation σ to the vector x (step S13).

The share [σ'''⁻¹] is output to the second vector separation units $114_1, \ldots, 114_N$.

For example, σ'''⁻¹=(0, 2, 1, 0, 1, 2, 3) is yielded when the permutation σ is the permutation of the Formula (1) above and the permutation σ' is the permutation of the Formula (2) above.

Step S14

The share [σ'''⁻¹] is input to the second vector separation units $114_1, \ldots, 114_N$.

The second vector separation units $114_1, \ldots, 114_N$ each use the share [σ'''⁻¹] to generate a share [$\sigma_0^{-1}$] of a vector $\sigma_0^{-1}$ which is formed from the first $m_0$ elements of the vector σ'''⁻¹ and a share [$\sigma_1^{-1}$] of a vector $\sigma_1^{-1}$ which is formed from the remaining $m_1$ elements of the vector σ'''⁻¹ (step S14).

The share [$\sigma_0^{-1}$] and the share [$\sigma_1^{-1}$] are output to the third permutation application units $115_1, \ldots, 115_N$.

For example, the vector $\sigma_0^{-1}=(0, 2, 1)$ and the vector $\sigma_1^{-1}=(0, 1, 2, 3)$ are yielded when $\sigma'''^{-1}=(0, 2, 1, 0, 1, 2, 3)$.

Step S15

The share $[\sigma_0^{-1}]$ and the share $[\sigma_1^{-1}]$, a share $[\pi_0]$ of a permutation $\pi_0$, and a share $[\pi_1]$ of a permutation $\pi_1$ are input to the third permutation application units $115_1, \ldots, 115_N$.

The third permutation application units $115_1, \ldots, 115_N$ each use the share $[\sigma_0^{-1}]$, the share $[\sigma_1^{-1}]$, the share $[\pi_0]$ of the permutation $\pi_0$, and the share $[\pi_1]$ of the permutation $\pi_1$ to generate a share $[\pi_0(\sigma_0^{-1})]$ of a vector $\pi_0(\sigma_0^{-1})$ which is generated by application of the permutation $\pi_0$ to the vector $\sigma_0^{-1}$ and a share $[\pi_1(\sigma_1^{-1})]$ of a vector $\pi_1(\sigma_1^{-1})$ which is generated by application of the permutation $\pi_1$ to the vector $\sigma_1^{-1}$, and release $\pi_0(\sigma_0^{-1})$ and $\pi_1(\sigma_1^{-1})$ (step S15).

The permutations $\pi_0$ and $\pi_1$ are predetermined permutations, which may be random permutations, for example. The permutations $\pi_0$ and $\pi_1$ may be predefined permutations or may be generated when the processing at step S15 is performed. The permutations $\pi_0$ and $\pi_1$ and their shares $[\pi_0]$ and $[\pi_1]$ can be generated by the approach described in Section 4.1 of Reference Literature 1, for example. It is assumed that the secure computing apparatus $1_n$ ($1 \leq n \leq N$) has information on the permutations $\pi_0$ and $\pi_1$ and their shares $[\pi_0]$ and $[\pi_1]$ and is capable of calculation using the permutations $\pi_0$ and $\pi_1$ and their shares $[\pi_0]$ and $[\pi_1]$.

For example, assume that the vector $\sigma_0^{-1}=(0, 2, 1)$ and the vector $\sigma_1^{-1}=(0, 1, 2, 3)$ hold, $\pi_0$ is the permutation represented by Formula (3) below, and $\pi_1$ is the permutation represented by Formula (4) below.

$$\pi_0 = \begin{pmatrix} 1 & 2 & 3 \\ 3 & 1 & 2 \end{pmatrix} \quad (3)$$

$$\pi_1 = \begin{pmatrix} 1 & 2 & 3 & 4 \\ 2 & 4 & 1 & 3 \end{pmatrix} \quad (4)$$

In this case, the vector $\pi_0(\sigma_0^{-1})=(2, 1, 0)$ and the vector $\pi_1(\sigma_1^{-1})=(2, 0, 3, 1)$ are yielded.

Step S16

The share $[k_0]$ of the vector $k_0$, the share $[v_0]$ of the vector $v_0$, the share $[k_1]$ of the vector $k_1$, and the share $[v_1]$ of the vector $v_1$ are input to the fourth permutation application units $116_1, \ldots, 116_N$.

The fourth permutation application units $116_1, \ldots, 116_N$ each use the share $[k_0]$ of the vector $k_0$, the share $[v_0]$ of the vector $v_0$, the share $[k_1]$ of the vector $k_1$, and the share $[v_1]$ of the vector $v_1$ to calculate a share $[k_0']$ of a vector $k_0'=(\pi_0(\sigma_0^{-1}))^{-1}(\pi_0(k_0))$, a share $[v_0']$ of a vector $v_0'=(\pi_0(\sigma_0^{-1}))^{-1}(\pi_0(v_0))$, a share $[k_1']$ of a vector $k_1'=(90_1(\sigma_1^{-1}))^{-1}(\pi_1(k_1'))$, and a share $[v_1']$ of a vector $v_1'=(\pi_1(\sigma_1^{-1}))^{-1}(\pi_1(v_1'))$ (step S16).

The share $[k_0']$, the share $[v_0']$, the share $[k_1']$, and the share $[v_1']$ are output to the first joined table generation units $117_1, \ldots, 117_N$.

For example, the vector $k_0'=(1, 3, 2)$, the vector $V_0'=(5, 1, 10)$, a vector $k_1'=(1, 3, 4, 5)$, and a vector $v_1'=(2, 4, 9, 8)$ are yielded in a case where the vector $k_0=(1, 2, 3)$, the vector $v_0=(5, 10, 1)$, the vector $k_1=(1, 3, 4, 5)$, and the vector $v_1'=(2, 4, 9, 8)$ hold, the permutation $\pi_0$ is the permutation represented by the Formula (3) above, and the permutation $\pi_1$ is the permutation represented by the Formula (4) above.

Step S17

The share $[k_0']$, the share $[v_0']$, the share $[k_1']$, and the share $[v_1']$ are input to the first joined table generation units $117_1, \ldots, 117_N$.

The first joined table generation units $117_1, \ldots, 117_N$ each use the share $[k_0']$, the share $[v_0']$, the share $[k_1']$, and the share $[v_1']$ to generate a joined table which joins a vector generated by extracting the first c elements of the vector $k_0'$, a vector generated by extracting the first c elements of the vector $v_0'$, a vector generated by extracting the first c elements of the vector $k_1'$, and a vector generated by extracting the first c elements of the vector $v_1'$, where c is the number of 0 elements in the vector $g_0$ or the vector $g_1$ (step S17).

For example, the joined table will be the table shown below when the vector $g_0=(0, 1, 0)$, the vector $k_0'=(1, 3, 2)$, the vector $V_0'=(5, 1, 10)$, the vector $k_1'=(1, 3, 4, 5)$, and the vector $v_1'=(2, 4, 9, 8)$.

| $k_0'$ | $v_0'$ | $k_1'$ | $v_1'$ | (A) |
|---|---|---|---|---|
| 1 | 5 | 1 | 2 | |
| 3 | 1 | 3 | 4 | |

The joined table (A) above is a table generated by inner join of the first table which has three records and consists of the vector of keys, $k_0=(1, 2, 3)$, and the vector of attribute values of one attribute, $v_0=(5, 10, 1)$, and the second table which consists of the vector of keys, $k_1=(1, 3, 4, 5)$, and the vector of attribute values of one attribute, $v_1=(2, 4, 9, 8)$.

In this manner, use of inverse permutation enables two tables to be joined while maintaining confidentiality in a case with no key overlap more rapidly than the technique of Non-patent Literature 1.

[Secure Joining System and Method for Performing Left Outer Join]

Figure 6:
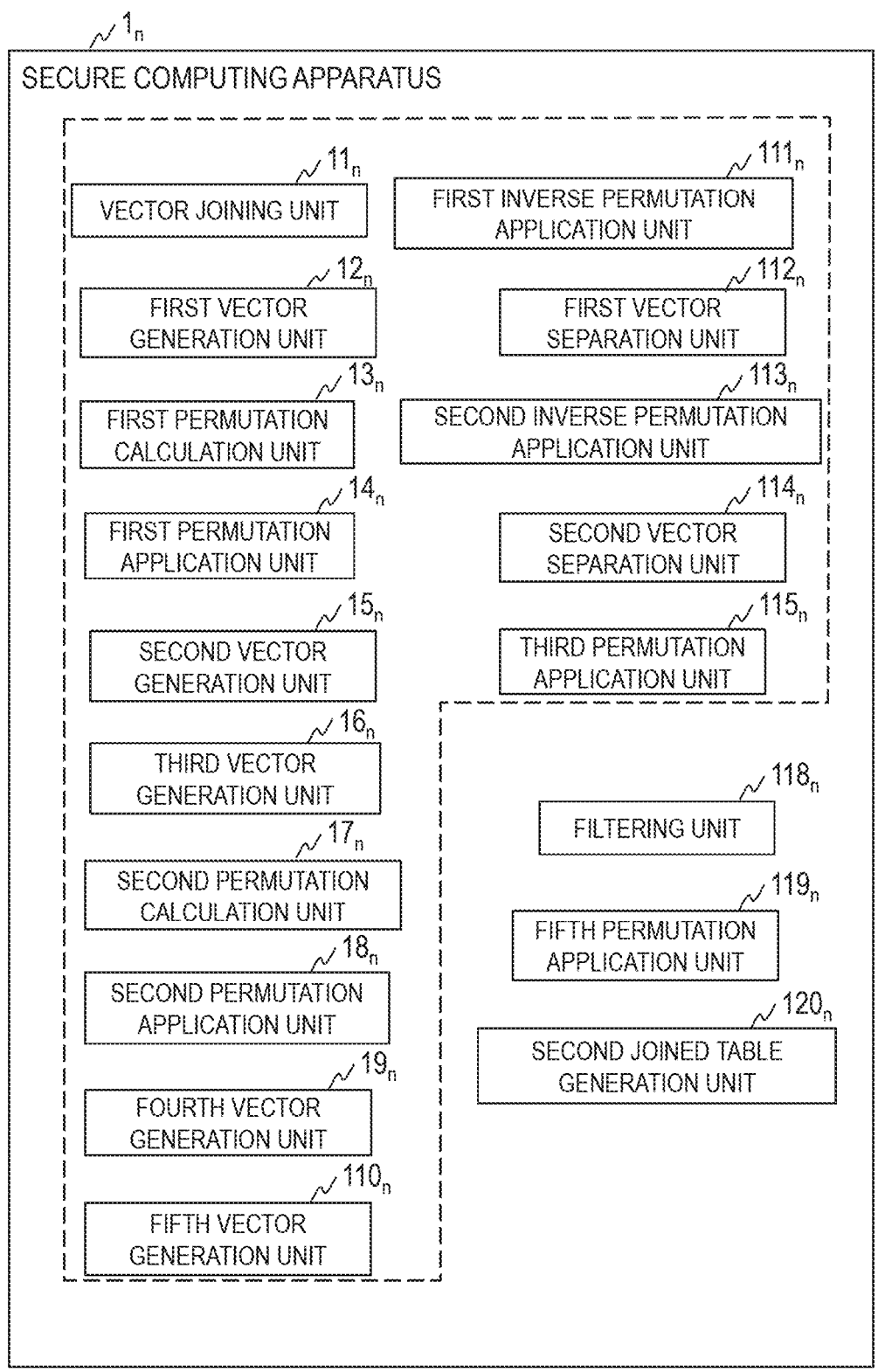
FIG. 6 illustrates a functional configuration of a secure computing apparatus of a secure joining system for performing left outer join.

Referring to FIG. 6, an exemplary configuration of a secure joining system according to an embodiment is described. This secure joining system and method performs so-called left outer join. That is, this secure joining system joins records that are common to the first table and the second table with records that exist only in the first table while maintaining confidentiality.

The secure joining system for performing left outer join is similar to the secure joining system for performing inner join except that it includes a filtering unit $118_n$, a fifth permutation application unit $119_n$, and a second joined table generation unit $120_n$ instead of including the fourth permutation application unit $116_n$ and the first joined table generation unit $117_n$.

The secure joining method for performing left outer join is similar to the secure joining method for performing inner join except that it performs the processing at steps S18 to S20 instead of performing the processing at step S16 and step S17.

In the following, differences from the secure joining system and method for performing inner join are described. The same portions as those of the secure joining system and method for performing inner join are not described again.

As shown in FIG. 6, the secure computing apparatus $1n$ of the secure joining system includes the vector joining unit $11_n$, the first vector generation unit $12_n$, the first permutation calculation unit $13_n$, the first permutation application unit $14_n$, the second vector generation unit $15_n$, the third vector generation unit $16_n$, the second permutation calculation unit $17_n$, the second permutation application unit $18_n$, the fourth vector generation unit $19_n$, the fifth vector generation unit $110_n$, the first inverse permutation application unit $111_n$, the first vector separation unit $112_n$, the second inverse permutation application unit $113_n$, the second vector separation unit $114_n$, the third permutation application unit $115_n$, the filtering unit $118_n$, the fifth permutation application unit $119_n$, and the second joined table generation unit $120_n$, for example.

First, processing at <step S1> to <step S15> is performed. As the processing at <step S1> to <step S15> is similar to the processing at <step S1> to <step S15> described in Section [Secure joining system and method for performing inner join], overlapping description is not repeated here.

Then, the processing at steps S18 to S20 described below is performed.

Step S18

The share $[g_1]$, the share $[k_1]$ of the vector $k_1$, and the share $[v_1]$ of the vector $v_1$ are input to the filtering units $118_1, \ldots, 118_N$.

The filtering units $118_1, \ldots, 118_N$ each use the share $[g_1]$, the share $[k_1]$ of the vector $k_1$, and the share $[v_1]$ of the vector $v_1$ to generate a modified second table in which if $g_{1,i}=1$, the ith element of the key of the second table is set to a predefined value $u_{1,k}$ indicating null and the ith element of the attribute of the second table is set to a predefined value $u_{1,v}$ indicating null, where $g_{1,i}$ is the ith element of the vector $g_1$ (step S18). Let $k_1'$ be the vector of the key of the modified second table, and let $v_1'$ be the vector of the attribute value of the modified second table.

The modified second table is output to the fifth permutation application units $119_1, \ldots, 119_N$.

For example, the modified second table will be the table shown below when the second table consists of the vector of keys, $k_1=(1, 3, 4, 5)$, and the vector of attribute values of one attribute, $v_1=(2, 4, 9, 8)$, and the vector $g_1=(0, 0, 1, 1)$ holds.

| $k_1'$ | $v_1'$ | (B) |
|---|---|---|
| 1 | 2 | |
| 3 | 4 | |
| null | null | |
| null | null | |

Step S19

The share $[k_0]$ of the vector $k_0$, the share $[v_0]$ of the vector $v_0$, the share $[k_1']$ of $k_1'$, which is the vector of the key of the modified second table, the share $[v_1']$ of $v_1'$, which is the vector of the attribute value of the modified second table, the share $[\pi_0]$ of the permutation $\pi_0$, the share $[\pi_1]$ of the permutation $\pi_1$, the share $[\pi_0(\sigma_0^{-1})]$, and the share $[\pi_1(\sigma_1^{-1})]$ are input to the fifth permutation application units $119_1, \ldots, 119_N$.

The fifth permutation application units $119_1, \ldots, 119_N$ each use the share $[k_0]$ of the vector $k_0$, the share $[V_0]$ of the vector $v_0$, the share $[k_1']$ of $k_1'$, which is the vector of the key of the modified second table, the share $[V_1']$ of $v_1'$, which is the vector of the attribute value of the modified second table, the share $[\pi_0]$ of the permutation $\pi_0$, the share $[\pi_1]$ of the permutation $\pi_1$, the share $[\pi_0(\sigma_0^{-1})]$, and the share $[\pi_1(\sigma_1^{-1})]$ to calculate the share $[k_0']$ of the vector $k_0'=(\pi_0(\sigma_0^{-1}))^{-1}(\pi_0(\pi_0))$, the share $[V_0']$ of the vector $V_0'=(\pi_0(\sigma_0^{-1}))^{-1}(\pi_0(V_0))$, a share $[k_1'']$ of a vector $k_1''=(\pi_1(\sigma_1^{-1}))^{-1}(\pi_1(k_1'))$, and a share $[V_1'']$ of a vector $v_1''=(\pi_1(\sigma_1^{-1}))^{-1}(\pi_1(V_1'))$ (step 19).

The share $[k_0']$, the share $[v_0']$, the share $[k_1'']$, and the share $[v_1'']$ are output to the second joined table generation units $120_1, \ldots, 120_N$.

For example, the vector $k_0'=(1, 3, 2)$, the vector $v_0'=(5, 1, 10)$, the vector $k_1''=(1, 3, u_{1,k}, u_{1,k})$, and the vector $v_1''=(2, 4, u_{1,v}, u_{1,v})$ are yielded in a case where the vector $k_0=(1, 2, 3)$, the vector $v_0=(5, 10, 1)$, the vector $k_1'=(1, 3, u_{1,k}, u_{1,k})$, and the vector $v_1'=(2, 4, u_{1,v}, u_{1,v})$ hold, the permutation $\pi_0$ is the permutation represented by the Formula (3) above, and the permutation $\pi_1$ is the permutation represented by the Formula (4) above.

Step S20

The share $[k_0']$, the share $[V_0']$, the share $[k_1']$, and the share $[V_1'']$ are input to the second joined table generation units $120_1, \ldots, 120_N$.

The second joined table generation units $120_1, \ldots, 120_N$ each use the share $[k_0']$, the share $[V_0']$, the share $[k_1'']$, and the share $[V_1'']$ to generate, when $m_0<m_1$, a joined table which joins the vector $k_0'$, the vector $V_0'$, a vector generated by extracting the first $m_0$ elements of the vector $k_1''$, and a vector generated by extracting the first $m_0$ elements of the vector $v_1''$, and to generate, when $m_0>m_1$, a joined table which joins a vector generated by adding $m_0-m_1$ elements being a predefined value $u_k$ indicating null to the vector $k_1''$, a vector generated by adding $m_0-m_1$ elements being a predefined value $u_v$ indicating null to the vector $v_1''$, the vector $k_0'$, and the vector $V_0'$ (step S20).

For example, the joined table will be the table shown below when the vector $k_0'=(1, 3, 2)$, the vector $v_0'=(5, 1, 10)$, the vector $k_1''=(1, 3, u_{1,k}, u_{1,k})$, and the vector $v_1''=(2, 4, u_{1,v}, u_{1,v})$.

| $k_0'$ | $v_0'$ | $k_1''$ | $v_1''$ | (C) |
|---|---|---|---|---|
| 1 | 5 | 1 | 2 | |
| 3 | 1 | 3 | 4 | |
| 2 | 10 | $u_k$ | $u_v$ | |

The joined table (C) above is a table generated by left outer join of the first table which has three records and consists of the vector of keys, $k_0=(1, 2, 3)$, and the vector of attribute values of one attribute, $v_0=(5, 10, 1)$, and the second table which consists of the vector of keys, $k_1=(1, 3, 4, 5)$, and the vector of attribute values of one attribute, $v_1=(2, 4, 9, 8)$.

As another example, the joined table will be the table shown below when the vector $k_0'=(1, 3, 4, 5)$, the vector $v_0'=(2, 4, 9, 8)$, the vector $k_1''=(1, 3)$, and the vector $v_1''=(5, 1)$.

| $k_0'$ | $v_0'$ | $k_1''$ | $v_1''$ | (D) |
|---|---|---|---|---|
| 1 | 2 | 1 | 5 | |
| 3 | 4 | 3 | 1 | |
| 4 | 9 | $u_k$ | $u_v$ | |
| 5 | 8 | $u_k$ | $u_v$ | |

With this embodiment, left outer join of the first table and the second table can be performed while maintaining confidentiality.

In this manner, use of inverse permutation enables two tables to be joined while maintaining confidentiality in a case with no key overlap more rapidly than the technique of Non-patent Literature 1.

Secure Joining System and Method for Performing Full Outer Join

Figure 7:
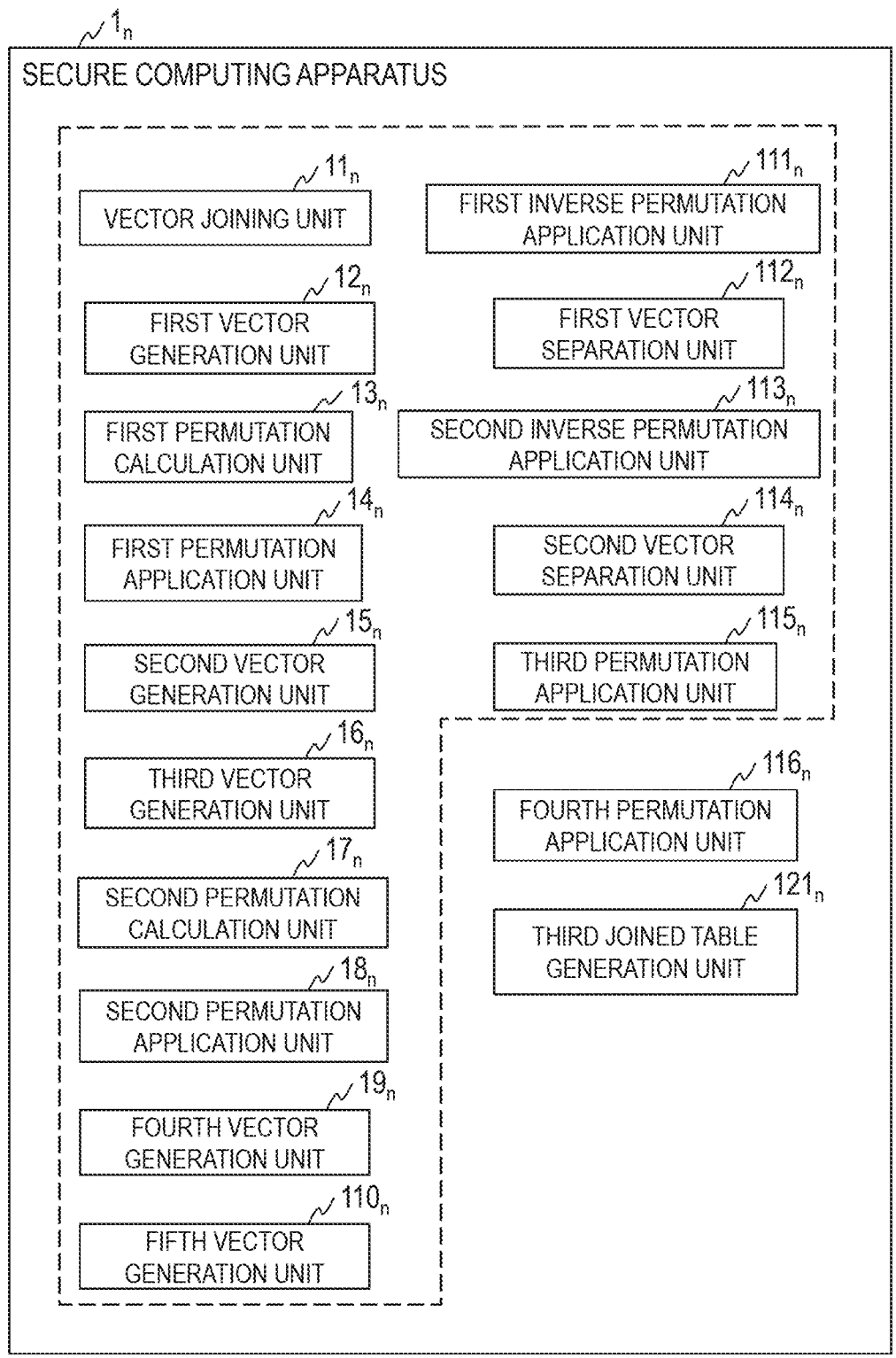
FIG. 7 illustrates a functional configuration of a secure computing apparatus of a secure joining system for performing full outer join.

Referring to FIG. 7, an exemplary configuration of a secure joining system according to an embodiment is described. This secure joining system and method performs so-called full outer join. In other words, this secure joining system joins records that are common to the first table and the second table, records that exist only in the first table, and records that exist only in the second table while maintaining confidentiality.

The secure joining system for performing full outer join is similar to the secure joining system for performing inner join except that it includes a third joined table generation unit $121_n$ instead of including the first joined table generation unit $117_n$.

The secure joining method for performing full outer join is similar to the secure joining method for performing inner join except that it performs the processing at step S21 instead of performing the processing at step S17.

In the following, differences from the secure joining system and method for performing inner join are described. The same portions as those of the secure joining system and method for performing inner join are not described again.

As shown in FIG. 7, the secure computing apparatus in of the secure joining system includes the vector joining unit $11_n$, the first vector generation unit $12_n$, the first permutation calculation unit $13_n$, the first permutation application unit $14_n$, the second vector generation unit $15_n$, the third vector generation unit $16_n$, the second permutation calculation unit $17_n$, the second permutation application unit $18_n$, the fourth vector generation unit $19_n$, the fifth vector generation unit $110_n$, the first inverse permutation application unit $111_n$, the first vector separation unit $112_n$, the second inverse permutation application unit $113_n$, the second vector separation unit $114_n$, the third permutation application unit $115_n$, the fourth permutation application unit $116_n$, and the third joined table generation unit $121_n$, for example.

First, processing at <step S1> to <step S16> is performed. As the processing at <step S1> to <step S16> is similar to the processing at <step S1> to <step S16> described in Section [Secure joining system and method for performing inner join], overlapping description is not repeated here.

Then, the processing at step S21 described below is performed.

Step S21

The share $[k_0']$, the share $[v_0']$, the share $[k_1']$, and the share $[v_1']$ are input to the third joined table generation units $121_1, \ldots, 121_N$.

The third joined table generation units $121_1, \ldots, 121_N$ each use the share $[k_0']$, the share $[v_0']$, the share $[k_1']$, and the share $[v_1']$ to generate a joined table which joins a table (1) which joins a vector generated by extracting the first c elements of the vector $k_0'$, a vector generated by extracting the first c elements of the vector $v_0'$, a vector generated by extracting the first c elements of the vector $k_1'$, and a vector generated by extracting the first c elements of the vector $v_1'$, a table (2) which joins a vector generated by extracting the remaining $m_0$-c elements of the vector $k_0'$, a vector generated by extracting the remaining $m_0$-c elements of the vector $v_0'$, and a vector having a value corresponding to the attribute value of the second table set to a predefined value $u'_{1,v}$ indicating null, and a table (3) which joins a vector generated by extracting the remaining $m_0$-c elements of the vector $v_0'$, a vector generated by extracting the remaining $m_1$-c elements of the vector $v_1'$, and a vector having a value corresponding to the attribute value of the first table set to a predefined value $u'_{0,v}$ indicating null, where c is the number of 0 elements in the vector $g_0$ or the vector $g_1$ (step S21).

For example, the joined table will be the table shown below when the vector $g_0=(0, 1, 0)$, the vector $k_0'=(1, 3, 2)$, the vector $V_0'=(5, 1, 10)$, the vector $k_1'=(1, 3, 4, 5)$, and the vector $v_1'=(2, 4, 9, 8)$.

In the table below, the table from the first row to the second row corresponds to table (1), the table in the third row corresponds to table (2), and the table from the fourth row to the fifth row corresponds to table (3).

| $k_0'$ | $v_0'$ | $k_1''$ | $v_1''$ | (E) |
|---|---|---|---|---|
| 1 | 5 | 1 | 2 | |
| 3 | 1 | 3 | 4 | |
| 2 | 10 | $u'_{1,u}$ | $u'_{1,v}$ | |
| $u'_{0,u}$ | $u'_{0,v}$ | 4 | 9 | |
| $u'_{0,u}$ | $u'_{0,v}$ | 5 | 8 | |

The joined table (E) above is a table generated by full outer join of the first table which has three records and consists of the vector of keys, $k_o=(1, 2, 3)$, and the vector of attribute values of one attribute, $v_0=(5, 10, 1)$, and the second table which consists of the vector of keys, $k_1=(1, 3, 4, 5)$, and the vector of attribute values of one attribute, $v_1=(2, 4, 9, 8)$.

In this manner, use of inverse permutation enables two tables to be joined while maintaining confidentiality in a case with no key overlap more rapidly than the technique of Non-patent Literature 1.

[Secure Joining Information Generation System]

In the secure computing apparatus $1_n$ of the secure joining system described above, the portion including the vector joining unit $11_n$, the first vector generation unit $12_n$, the first permutation calculation unit $13_n$, the first permutation application unit $14_n$, the second vector generation unit $15_n$, the third vector generation unit $16_n$, the second permutation calculation unit $17_n$, the second permutation application unit $18_n$, the fourth vector generation unit $19_n$, the fifth vector generation unit 110C, the first inverse permutation application unit $111n$, the first vector separation unit $112_n$, the second inverse permutation application unit $113_n$, the second vector separation unit $114_n$, and the third permutation application unit 115, represents the secure joining information generation system.

In other words, the secure computing apparatus $1_n$ of the secure joining information generation system includes the vector joining unit $11_n$, the first vector generation unit $12_n$, the first permutation calculation unit $13_n$, the first permutation application unit $14_n$, the second vector generation unit $15_n$, the third vector generation unit $16_n$, the second permutation calculation unit $17_n$, the second permutation application unit $18_n$, the fourth vector generation unit $19_n$, the fifth vector generation unit 110C, the first inverse permutation application unit $111_n$, the first vector separation unit $112_n$, the second inverse permutation application unit $113_n$, the second vector separation unit $114_n$, and the third permutation application unit 115, as shown by broken lines in FIGS. 2, 6, and 7.

The secure joining information generation method is implemented by the execution of steps S1 to S15 by the components of the secure computing apparatus $1_n$ of the secure joining information generation system. As the processing at step S1 to step S15 is similar to those described above, overlapping description is not repeated.

Multiple secure joining information generation units of the secure joining information generation system can be said to use the share $[k_0]$ of the vector $k_0$, the share $[k_1]$ of the vector $k_1$, the share $[\pi_0]$ of the permutation $\pi_0$, and the share $[\pi_1]$ of the permutation $\pi_1$ to generate: the share $[\pi_0(\sigma_0^{-1})]$ of the vector $\pi_0(\sigma_0^{-1})$ which is generated by application of the permutation $\pi_0$ to the inverse permutation $\sigma_0^{-1}$ of the permutation $\sigma_0$, where permutation of each vector of the first table with the permutation $\sigma_0$ causes records for keys common to the first table and the second table to move to the head side; the share $[\pi_1(\sigma_1^{-1})]$ of the vector $\pi_1(\sigma_1^{-1})$ which is generated by application of the permutation $\pi_1$ to the inverse permutation $\sigma_1^{-1}$ of the permutation $\sigma_1$, where permutation of each vector of the second table with the permutation $\sigma_1$ causes records for keys common to the first table and the second table to move to the head side; the share $[g_0]$ of the vector $g_0$ which is formed from a value $g_{0,i}$ indicating whether the ith record of the first table is a record for a key that is common to the first table and the second table; and the share $[g_1]$ of the vector g1 which is formed from a value $g_{1,i}$ indicating whether the ith record of the second table is a record for a key that is common to the first table and the second table.

Modifications

While the embodiments of the present invention have been described, specific configurations are not limited to these embodiments, but design modifications and the like within a range not departing from the spirit of the invention are encompassed in the scope of the invention, of course.

For example, the attribute of a key may be a composite key of x attributes, where x is a positive integer greater than or equal to 2. In this case, the processing at step S1 may be performed in the following manner, for example.

The keys of the first table are assumed to be $k_{0,0}, \ldots, k_{0,x-1}$. The keys of the second table are assumed to be $k_{1,0}, \ldots, k_{1,x-1}$.

In this case, the processing at step S1 joins $k_{0,i}$ and $k_{1,i}$ to obtain $k'_i$ for each i (where $i=0, \ldots, x-1$). Then, each $k'_i$ is turned into a bit representation by bit decomposition and joined horizontally. For example, when $k'_0=(1, 2, 3, 1, 3, 0, 1)^T$ and $k'_1=(0, 0, 0, 0, 0, 1, 1)^T$, bit decomposition of $k'_0$ results in $(k'_0)_0=(1, 0, 1, 1, 1, 0, 1)^T$ and $(k'_0)_1=(0, 1, 1, 0, 1, 0, 0)^T$.

Here, since $k'_0$ assumes a value from 1 to 3, each element of $k'_0$ can be represented in 2 bits. $(k'_0)_0$ is the lower bit of $k'_0$ upon bit decomposition, and $(k'_0)_1$ is the upper bit of $k'_0$ upon bit decomposition. Since $k'_1$ is inherently a 1-bit number in this example, it does not require decomposition and $k'_1=(k'_1)_0$ is assumed. Horizontal joining of $(k'_0)_0$, $(k'_0)_1$, and $(k'_1)_0$ gives:

$$\begin{pmatrix} 1. & 0. & 1. & 1. & 1. & 0. & 1 \\ 0. & 1. & 1. & 0. & 1. & 0. & 0 \\ 0. & 0. & 0. & 0. & 0. & 1. & 1 \end{pmatrix}^T.$$

Regarding such an arrangement as a matrix and regarding each row of this matrix as a bit representation of the keys of one record, a vector of bit representations of keys, (1, 2, 3, 1, 3, 4, 5), is obtained. This vector can be k' which is used at step S2 and after. In this manner, a case with a composite key can also be addressed.

For a composite key, overlap of keys refers to whether keys overlap in terms of combination of the values of the all key attributes and it is assumed that mere overlapping of the values of individual attributes is not regarded as an overlap. For example, a combination of (1, 0) and (1, 1) is not an overlap.

The various processes described in the embodiments may be executed in parallel or separately depending on the processing ability of an apparatus executing the process or on any necessity, rather than being executed in time series in accordance with the described order.

Program and Recording Medium

When various types of processing functions in the apparatuses described in the above embodiments are implemented on a computer, the contents of processing function to be contained in each apparatus is written by a program. With this program executed on the computer, various types of processing functions in the above-described apparatuses are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example.

Furthermore, this program may be stored in a storage unit of a server computer and transferred from the server computer to other computers via a network so as to be distributed.

A computer which executes such program first stores the program recorded in a portable recording medium or transferred from a server computer once in a storage unit thereof, for example. When the processing is performed, the computer reads out the program stored in the storage unit thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program in this form includes information which is provided for processing performed by electronic calculation equipment and which is equivalent to a program (such as data which is not a direct instruction to the computer but has a property specifying the processing performed by the computer).

In this form, the present apparatus is configured with a predetermined program executed on a computer. However, the present apparatus may be configured with at least part of these processing contents realized in a hardware manner.

What is claimed is:

1. A secure joining information generation system comprising:
a plurality of secure computing apparatuses, wherein
$F_k$ and $F_v$ are arbitrary rings; $[\alpha]$ is a share generated by secret sharing of $\alpha$, with $\alpha$ being an arbitrary vector or arbitrary permutation; $m_0$ and $m_1$ are integers greater than or equal to 1; $k_0 \in F_k^{m0}$ is a vector of a key of a first table; $v_0 \in F_v^{m0}$ is a vector of an attribute value of the first table; $k_1 \in F_k^{m1}$ is a vector of a key of a second table; $V_1 \in F_v^{m0}$ is a vector of an attribute value of the second table; and $\pi_0$ and $\pi_1$ are predetermined permutations with lengths of $m_0$ and $m_1$, respectively, and
the plurality of secure computing apparatuses include processing circuitry configured to
use a share $[k_0]$ of the vector $k_0$ and a share $[k_1]$ of the vector $k_1$ to generate a share $[k]$ of a vector $k \in [F_k]^{m0+m1}$ which is generated by joining the vector $k_0$ and the vector $k_1$,
generate a share $[f]$ of a vector $f$ which is generated by joining $m_0$ 0's and $m_1$ 1's,
use the share $[k]$ to generate a share $[\sigma]$ of a permutation $\sigma$ for stable sorting of the vector $k$,
use the share $[k]$, the share $[\sigma]$, and the share $[f]$ to generate a share $[\sigma(k)]$ of a vector $\sigma(k)$ which is generated by application of the permutation $\sigma$ to the vector $k$ and a share $[\sigma(f)]$ of a vector $\sigma(f)$ which is generated by application of the permutation $\sigma$ to the vector $f$,
use the share $[\sigma(k)]$ to generate a share $[e]$ of a vector $e$ which has 1 when a certain element of the vector $\sigma(k)$ and an element following that element are the same and has 0 when they are different as an element corresponding to that element,
use the share $[e]$ to generate a share $[e']$ of a vector $e'$, which is generated by bit inversion of each element of a vector which has 1 when one of a certain element of the vector $e$ and an element preceding that element is 1 and has 0 otherwise as an element corresponding to that element,
use the share $[e']$ to generate a share $[\sigma']$ of a permutation $\sigma'$ for stable sorting of the vector $e'$,
use the share $[\sigma(f)]$ and the share $[\sigma']$ to generate a share $[f']$ of a vector $f'=\sigma'(\sigma(f))$ which is generated by application of the permutation $\sigma'$ to the vector $\sigma(f)$,
use the share $[f']$ to generate a share $[s]$ of a vector $s$, each element of which is a sum of elements of the vector $f$ up to an element corresponding to that element, the elements including the element corresponding to that element, and a share $[s']$ of a vector $s'$, each element of which is a sum of elements of a bit-inverted vector up to an element corresponding to that element, the elements including the element corresponding to that element, where the bit-inverted vector is a vector generated by bit inversion of each element of the vector $f'$,
use the share $[f']$, the share $[s]$, and the share $[s']$ to calculate a share $[\sigma'']$ of a vector $\sigma''=f's+(1-f')s'-1$,
use the share $[e']$ and the share $[\sigma]$ to generate a share $[e'']$ of a vector $e''=\sigma^{-1}(e')$ which is generated by application of an inverse permutation $\sigma^{-1}$ of the permutation $\sigma$ to the vector $e'$,
use the share $[e'']$ to generate a share $[g_0]$ of a vector $g_0$ which is formed from first $m_0$ elements of the vector $e''$ and a share $[g_1]$ of a vector $g_1$ which is formed from remaining $m_1$ elements of the vector $e''$,
use the share $[\sigma'']$, the share $[\sigma]$, and the share $[\sigma']$ to generate a share $[\sigma'''^{-1}]$ of a vector $\sigma'''^{-1}=\sigma^{-1}(\sigma'^{-1}(\sigma''))$ which is generated by application of an inverse permutation $\sigma'^{-1}$ of the permutation $\sigma'$ and the inverse permutation $\sigma^{-1}$ of the permutation $\sigma$ to the vector $x$,
use the share $[\sigma'''^{-1}]$ to generate a share $[\sigma_0^{-1}]$ of a vector $\sigma_1^{-1}$ which is formed from first $m_0$ elements of the vector $\sigma'''^{-1}$ and a share $[\sigma_0^{-1}]$ of a vector $\sigma_1^{-1}$ which is formed from remaining $m_1$ elements of the vector $\sigma'''^{-1}$, and
use the share $[\sigma_0^{-1}]$, the share $[\sigma_1^{-1}]$, a share $[\pi_0]$ of the permutation $\pi_0$, and a share $[\pi_1]$ of the permutation $\pi_1$ to generate a share $[\pi_0(\sigma_0^{-1})]$ of a vector $\pi_0(\sigma_0^{-1})$ which is generated by application of the permutation $\pi_0$ to the vector $\sigma_0^{-1}$ and a share $[\pi_1(\sigma_1^{-1})]$ of a vector $\pi_1(\sigma_1^{-1})$ which is generated by application of the permutation $\pi_1$ to the vector $\sigma_1^{-1}$, and release the $\pi_0(\sigma_0^{-1})$ and the $\pi_1(\sigma_1^{-1})$.

2. A secure joining system comprising:
the plurality of secure computing apparatuses of the secure joining information generation system according to claim 1, wherein
the plurality of secure computing apparatuses further include
processing circuitry configured to
use the share $[k_0]$ of the vector $k_0$, a share $[V_0]$ of the vector $v_0$, the share $[k_1]$ of the vector $k_1$, and a share $[V_1]$ of the vector $v_1$ to calculate a share $[k_0']$ of a vector $k_0'=(\pi_0(\sigma_0^{-1}))^{-1}(\pi_0(k_0))$, a share $[V_0']$ of a vector $V_0'=(\pi_0(\sigma_0^{-1})(\pi_0)V_0)$, a share $[k_1']$ of a vector $k_1'=(\pi_1(\sigma_1^{-1}))^{-1}(\pi_1(k_1'))$, and a share $[V_1']$ of a vector $v_1'=(\pi_1(\sigma_1^{-1}))^{-1}(\pi_1(V_1'))$, and
use the share $[k_0']$, the share $[V_0']$, the share $[k_1']$, and the share $[V_1']$ to generate a joined table which joins a vector generated by extracting first c elements of the vector $k_0'$, a vector generated by extracting first c elements of the vector $V_0'$, a vector generated by extracting first c elements of the vector $k_1'$, and a vector generated by extracting first c elements of the vector $v_1'$, where c is the number of 0 elements in the vector $g_0$ or the vector $g_1$.

3. A secure joining system comprising:
a plurality of secure computing apparatuses, wherein
$F_k$ and $F_v$ are arbitrary rings; $[\alpha]$ is a share generated by secret sharing of $\alpha$, with $\alpha$ being an arbitrary vector or arbitrary permutation; $m_0$ and $m_1$ are integers greater than or equal to 1; $k_0 \in F_k^{m0}$ is a vector of a key of a first table; $v_0 \in F_v^{m0}$ is a vector of an attribute value of the first table; $k_1 \in F_k^{m1}$ is a vector of a key of a second table; $v_1 \in F_v^{m1}$ is a vector of an attribute value of the second table; and $\pi_0$ and $\pi_1$ are predetermined permutations with lengths of $m_0$ and $m_1$, respectively, and
the plurality of secure computing apparatuses include processing circuitry configured to
use a share $[k_0]$ of the vector $k_0$, a share $[k_1]$ of the vector $k_1$, a share $[\pi_0]$ of the permutation $\pi_0$, and a share $[\pi_1]$ of the permutation $\pi_1$ to generate: a share $[\pi_0(\sigma_0^{-1})]$ of a vector $\pi_0(\sigma_0^{-1})$ which is generated by application of the permutation $\pi_0$ to an inverse permutation $\sigma_0^{-1}$ of a permutation $\sigma_0$, where permutation of each vector of the first table with the permutation $\sigma_0$ causes records for keys common to the first table and the second table to move to a head side; a share $[\pi_1(\sigma_1^{-1})]$ of a vector $\pi_1(\sigma_1^{-1})$ which is generated by application of the permutation $\pi_1$ to an inverse permutation $\sigma_1^{-1}$ of a permutation $\sigma_1$, where permutation of each vector of the second table with the permutation $\sigma_1$ causes records for keys common to the first table and the second table to move to the head side; a share $[g_0]$ of a vector $g_0$ which is formed from a value $g_{0,i}$ indicating whether the ith record of the first table is a record for a key that is common to the first table and the second table; and a share $[g_1]$ of a vector $g_1$ which is formed from a value $g_{1,i}$ indicating whether the ith record of the second table is a record for a key that is common to the first table and the second table, use the share $[g_1]$, the share $[k_1]$ of the vector $k_1$, and the share $[V_1]$ of the vector $v_1$ to generate a modified second table in which if $g_{1,i}=1$, the ith element of the key of the second table is set to a predefined value $u_{1,k}$ indicating null and the ith element of the attribute of the second table is set to a predefined value $u_{1,v}$ indicating null, where $g_{1,i}$ is the ith element of the vector $g_1$, use the share $[k_0]$ of the vector $k_0$, a share $[V_0]$ of the vector $v_0$, a share $[k_1']$ of $k_1'$, which is a vector of the key of the modified second table, a share $[V_1']$ of $v_1'$, which is a vector of the attribute value of the modified second table, the share $[\pi_0]$ of the permutation $\pi_0$, the share $[\pi_1]$ of the permutation $\pi_1$, the share $[\pi_0(\sigma_0^{-1})]$, and the share $[\pi_1(\sigma_1^{-1})]$ to calculate a share $[k_0']$ of a vector $k_0'=(\pi_0(\sigma_0^{-1}))^{-1}(\pi_0(k_0)))$, a share $[V_0']$ of a vector $V_0'=(\pi_0(\sigma_0^{-1}))^{-1}(\pi_0(V_0))$, a share $[k_1'']$ of a vector $k_1''=(\pi_1(\sigma_1^{-1}))^{-1}(\pi_1(k_1'))$, and a share $[V_1'']$ of a vector $v_1''=(\pi_1(\sigma_1^{-1}))^{-1}(\pi_1(V_1'))$, and use the share $[k_0']$, the share $[V_0']$, the share $[k_1'']$, and the share $[V_1'']$ to generate, when $m_0<m_1$, a joined table which joins the vector $k_0'$, the vector $V_0'$, a vector generated by extracting first $m_0$ elements of the vector $k_1''$, and a vector generated by extracting first $m_0$ elements of the vector $v_1''$, and to generate, when $m_0>m_1$, a joined table which joins the vector $k_0'$, the vector $V_0'$, a vector generated by adding $m_0<m_1$ elements being a predefined value $u_k$ indicating null to the vector $k_1''$, and a vector generated by adding $m_0-m_1$ elements being a predefined value $u_v$ indicating null to the vector $v_1''$.

4. A secure computing apparatus of the secure joining information generation system according to claim 1 or the secure joining system according to claim 2 or 3.

5. A secure joining system comprising:
a plurality of secure computing apparatuses, wherein $F_k$ and $F_v$ are arbitrary rings: $[\alpha]$ is a share generated by secret sharing of $\alpha$, with $\alpha$ being an arbitrary vector or arbitrary permutation; $m_0$ and $m_1$ are integers greater than or equal to 1; $k_0 \in F_k^{m0}$ is a vector of a key of a first table; $v_0 \in F_v^{m0}$ is a vector of an attribute value of the first table; $k_1 \in F_k^{m1}$ is a vector of a key of a second table; $V_1 \in F_v^{m1}$ is a vector of an attribute value of the second table; and $\pi_0$ and $\pi_1$ are predetermined permutations with lengths of $m_0$ and $m_1$, respectively, and
the plurality of secure computing apparatuses include
processing circuitry configured to
use a share $[k_0]$ of the vector $k_0$, a share $[k_1]$ of the vector $k_1$, a share $[\pi_0]$ of the permutation $\pi_0$, and a share $[\pi_1]$ of the permutation $\pi_1$ to generate: a share $[\pi_0(\sigma_0^{-1})]$ of a vector $\pi_0(\sigma_0^{-1})$ which is generated by application of the permutation $\pi_0$ to an inverse permutation $\sigma_0^{-1}$ of a permutation $\sigma_0$, where permutation of each vector of the first table with the permutation $\sigma_0$ causes records for keys common to the first table and the second table to move to a head side; a share $[\pi_1(\sigma_1^{-1})]$ of a vector $\pi_1(\sigma_1^{-1})$ which is generated by application of the permutation $\pi_1$ to an inverse permutation $\sigma_1^{-1}$ of a permutation $\sigma_1$, where permutation of each vector of the second table with the permutation $\sigma_1$ causes records for keys common to the first table and the second table to move to the head side; a share $[g_0]$ of a vector $g_0$ which is formed from a value $g_{0,i}$ indicating whether the ith record of the first table is a record for a key that is common to the first table and the second table; and a share $[g_1]$ of a vector $g_1$ which is formed from a value $g_{1,i}$ indicating whether the ith record of the second table is a record for a key that is common to the first table and the second table, use the share $[k_0]$ of the vector $k_0$, a share $[V_0]$ of the vector $v_0$, the share $[k_1]$ of the vector $k_1$, and a share $[V_1]$ of the vector $v_1$ to calculate a share $[k_0']$ of a vector $k_0'=(\pi_0(\sigma_0^{-1}))^{-1}(\pi_0(k_0)))$, a share $[V_0']$ of a vector $V_0'=(\pi_0(\sigma_0^{-1}))^{-1}(\pi_0(V_0))$, a share $[k_1']$ of a vector $k_1'=(\pi_1(\sigma_1^{-1}))^{-1}(\pi_1(k_1'))$, and a share $[V_1']$ of a vector $v_1'=(\pi_1(\sigma_1^{-1}))^{-1}(\pi_1(V_1'))$, and use the share $[k_0']$, the share $[V_0']$, the share $[k_1']$, and the share $[V_1']$ to generate a joined table which joins a table (1) which joins a vector generated by extracting first c elements of the vector $k_0'$, a vector generated by extracting first c elements of the vector $V_0'$, a vector generated by extracting first c elements of the vector $k_1'$, and a vector generated by extracting first c elements of the vector $v_1'$, a table (2) which joins a vector generated by extracting remaining $m_0$-c elements of the vector $k_0'$, a vector generated by extracting remaining $m_0$-c elements of the vector $V_0'$, and a vector having a value corresponding to the attribute value of the second table set to a predefined value $u'_{1,v}$ indicating null, and a table (3) which joins a vector generated by extracting remaining $m_0$-c elements of the vector $V_0'$ a vector generated by extracting remaining $m_1$-c elements of the vector $V_1'$, and a vector having a value corresponding to the attribute value of the first table set to a predefined value $u'_{0,v}$ indicating null, where c is the number of 0 elements in the vector $g_0$ or the vector $g_1$.

6. The secure joining system according to claim 3 or 5, wherein the plurality of secure computing apparatuses further include
processing circuitry configured to
use a share $[k_0]$ of the vector $k_0$ and a share $[k_1]$ of the vector $k_1$ to generate a share $[k]$ of a vector $k \in [F_k]^{m0+m1}$ which is generated by joining the vector $k_0$ and the vector $k_1$,
generate a share $[f]$ of a vector f which is generated by joining $m_0$ 0's and m1 1's,
use the share $[k]$ to generate a share $[\sigma]$ of a permutation $\sigma$ for stable sorting of the vector k,
use the share $[k]$, the share $[\sigma]$, and the share $[f]$ to generate a share $[\sigma(k)]$ of a vector $\sigma(k)$ which is generated by application of the permutation $\sigma$ to the vector k and a share $[\sigma(f)]$ of a vector $\sigma(f)$ which is generated by application of the permutation $\sigma$ to the vector f,
use the share $[\sigma(k)]$ to generate a share $[e]$ of a vector e which has 1 when a certain element of the vector $\sigma(k)$ and an element following that element are the same and has 0 when they are different as an element corresponding to that element, use the share [e] to generate a share [e'] of a vector e', which is generated by bit inversion of each element of a vector which has 1 when one of a certain element of the vector e and an element preceding that element is 1 and has 0 otherwise as an element corresponding to that element, use the share [e'] to generate a share [σ'] of a permutation σ' for stable sorting of the vector e', use the share [σ(f)] and the share [σ'] to generate a share [f'] of a vector f'=σ'(σ(f)) which is generated by application of the permutation σ' to the vector σ(f), use the share [f'] to generate a share [s] of a vector s, each element of which is a sum of elements of the vector f' up to an element corresponding to that element, the elements including the element corresponding to that element, and a share [s'] of a vector s', each element of which is a sum of elements of a bit-inverted vector up to an element corresponding to that element, the elements including the element corresponding to that element, where the bit-inverted vector is a vector generated by bit inversion of each element of the vector f', use the share [f'], the share [s], and the share [s'] to calculate a share [σ''] of a vector σ''=fs+(1−f)s'−1, use the share [e'] and the share [σ] to generate a share [e''] of a vector e''=σ'(e') which is generated by application of an inverse permutation $σ'^{-1}$ of the permutation σ to the vector e', use the share [e''] to generate a share [$g_0$] of a vector $g_0$ which is formed from first $m_0$ elements of the vector e'' and a share [$g_1$] of a vector $g_1$ which is formed from remaining $m_1$ elements of the vector e'', use the share [σ''], the share [σ], and the share [σ'] to generate a share [$σ'''^{-1}$] of a vector $σ'''−1=σ^{-1}(σ'^{-1}(σ''))$ which is generated by application of an inverse permutation $σ'^{-1}$ of the permutation σ' and the inverse permutation $σ^{-1}$ of the permutation σ to the vector x, use the share [$σ'''^{-1}$] to generate a share [$σ_0^{-1}$] of a vector $σ_0^{-1}$ which is formed from first $m_0$ elements of the vector $σ'''^{-1}$ and a share [$σ_1^{-1}$] of a vector $σ_1^{-1}$ which is formed from remaining $m_1$ elements of the vector $σ'''^{-1}$, and use the share [$σ_0^{-1}$], the share [$σ_1^{-1}$], a share [$π_0$] of the permutation $π_0$, and a share [$π_1$] of the permutation $π_1$ to generate a share [$π_0(σ_0^{-1})$] of a vector $π_0(σ_0^{-1})$ which is generated by application of the permutation $π_0$ to the vector $σ_0^{-1}$ and a share [$π_1(σ_1^{-1})$] of a vector $π_1(σ_1^{-1})$ which is generated by application of the permutation $π_1$ to the vector $σ_1^{-1}$, and release the $π_0(σ_0^{-1})$ and the $π_1(σ_1^{-1})$.

7. A secure joining information generation method, where $F_k$ and $F_v$ are arbitrary rings; [α] is a share generated by secret sharing of α, with α being an arbitrary vector or arbitrary permutation; $m_0$ and $m_1$ are integers greater than or equal to 1; $k_0 \in F_k^{m0}$ is a vector of a key of a first table; $v_0 \in F_v^{m0}$ is a vector of an attribute value of the first table; $k_1 \in F_k^{m1}$ is a vector of a key of a second table; $V_1 \in F_v^{m1}$ is a vector of an attribute value of the second table; and $π_0$ and $π_1$ are predetermined permutations with lengths of $m_0$ and $m_1$, respectively, the secure joining information generation method comprising:

a vector joining step in which a plurality of vector joining circuitries use a share [$k_0$] of the vector $k_0$ and a share [$k_1$] of the vector $k_1$ to generate a share [k] of a vector $k \in [F_k]^{m0+m1}$ which is generated by joining the vector $k_0$ and the vector $k_1$;

a first vector generation step in which a plurality of first vector generation circuitries generate a share [f] of a vector f which is generated by joining $m_0$ 0's and $m_1$ 1's;

a first permutation calculation step in which a plurality of first permutation calculation circuitries use the share [k] to generate a share [σ] of a permutation σ for stable sorting of the vector k;

a first permutation application step in which a plurality of first permutation application circuitries use the share [k], the share [σ], and the share [f] to generate a share [σ(k)] of a vector σ(k) which is generated by application of the permutation σ to the vector k and a share [σ(f)] of a vector σ(f) which is generated by application of the permutation σ to the vector f;

a second vector generation step in which a plurality of second vector generation circuitries use the share [σ(k)] to generate a share [e] of a vector e which has 1 when a certain element of the vector σ(k) and an element following that element are the same and has 0 when they are different as an element corresponding to that element;

a third vector generation step in which a plurality of third vector generation circuitries use the share [e] to generate a share [e'] of a vector e', which is generated by bit inversion of each element of a vector which has 1 when one of a certain element of the vector e and an element preceding that element is 1 and has 0 otherwise as an element corresponding to that element:

a second permutation calculation step in which a plurality of second permutation calculation circuitries use the share [e'] to generate a share [σ'] of a permutation σ' for stable sorting of the vector e';

a second permutation application step in which a plurality of second permutation application circuitries use the share [σ(f)] and the share [σ'] to generate a share [f'] of a vector f=σ'(σ(f)) which is generated by application of the permutation σ' to the vector σ(f):

a fourth vector generation step in which a plurality of fourth vector generation circuitries use the share [f'] to generate a share [s] of a vector s, each element of which is a sum of elements of the vector f' up to an element corresponding to that element, the elements including the element corresponding to that element, and a share [s'] of a vector s', each element of which is a sum of elements of a bit-inverted vector up to an element corresponding to that element, the elements including the element corresponding to that element, where the bit-inverted vector is a vector generated by bit inversion of each element of the vector f;

a fifth vector generation step in which a plurality of fifth vector generation circuitries use the share [f'], the share [s], and the share [s'] to calculate a share [σ''] of a vector σ''=fs+(1−f)s'−1;

a first inverse permutation application step in which a plurality of first inverse permutation application circuitries use the share [e'] and the share [σ] to generate a share [e''] of a vector e''=$σ^{-1}$(e') which is generated by application of an inverse permutation a-1 of the permutation σ to the vector e':

a first vector separation step in which a plurality of first vector separation circuitries use the share [e''] to generate a share [$g_0$] of a vector $g_0$ which is formed from first $m_0$ elements of the vector e" and a share $[g_1]$ of a vector $g_1$ which is formed from remaining $m_1$ elements of the vector e";

a second inverse permutation application step in which a plurality of second inverse permutation application circuitries use the share $[\sigma"]$, the share $[\sigma]$, and the share $[\sigma']$ to generate a share $[\sigma'''^{-1}]$ of a vector $\sigma'''^{-1}=\sigma^{-1}(\sigma'^{-1}(\sigma"))$ which is generated by application of an inverse permutation $\sigma'^{-1}$ of the permutation $\sigma'$ and the inverse permutation $\sigma^{-1}$ of the permutation $\sigma$ to the vector x;

a second vector separation step in which a plurality of second vector separation circuitries use the share $[\sigma'''^{-1}]$ to generate a share $[\sigma_0^{-1}]$ of a vector $\sigma_0^{-1}$ which is formed from first $m_0$ elements of the vector $\sigma'''^{-1}$ and a share $[\sigma_1^{-1}]$ of a vector $\sigma_1^{-1}$ which is formed from remaining $m_1$ elements of the vector $\sigma'''^{-1}$; and a third permutation application step in which a plurality of third permutation application circuitries use the share $[\sigma_0^{-1}]$, the share $[\sigma_1^{-1}]$, a share $[\pi_0]$ of the permutation $\pi_0$, and a share $[\pi_1]$ of the permutation $\pi_1$ to generate a share $[\pi_0(\sigma_0^{-1})]$ of a vector $\pi_0(\sigma_0^{-1})$ which is generated by application of the permutation $\pi_0$ to the vector $\sigma_0^{-1}$ and a share $[\pi_1(\sigma_1^{-1})]$ of a vector $\pi^1(\sigma_1^{-1})$ which is generated by application of the permutation $\pi_1$ to the vector $\sigma_1^{-1}$, and release the $\pi_0(\sigma_0^{-1})$ and the $\pi_1(\sigma_1^{-1})$.

8. A secure joining method comprising:

the steps of the secure joining information generation system according to claim 7;

a fourth permutation application step in which a plurality of fourth permutation application circuitries use the share $[k_0]$ of the vector $k_0$, a share $[V_0]$ of the vector $v_0$, the share $[k_1]$ of the vector $k_1$, and a share $[V_1]$ of the vector $v_1$ to calculate a share $[k_0']$ of a vector $k_0'=(\pi_0(\sigma_0^{-1}))^{-1}(\pi_0(k_0))$, a share $[V_0']$ of a vector $V_0'=(\pi_0(\sigma_0^{-1}))^{-1}(\pi_0(V_0))$, a share $[k_1']$ of a vector $k_1'=(\pi_1(\sigma^{-1}))^{-1}(\pi_1(k_1'))$, and a share $[V_1']$ of a vector $v_1'=(\pi_1(\sigma_1^{-1}))^{-1}(\pi_1(V_1'))$; and a first joined table generation step in which a plurality of first joined table generation circuitries use the share $[k_0']$, the share $[V_0']$, the share $[k_1']$, and the share $[V_1']$ to generate a joined table which joins a vector generated by extracting first c elements of the vector $k_0'$, a vector generated by extracting first c elements of the vector $V_0'$, a vector generated by extracting first c elements of the vector $k_1'$, and a vector generated by extracting first c elements of the vector $v_1'$, where c is the number of 0 elements in the vector $g_0$ or the vector $g_1$.

9. A secure joining method, where $F_k$ and FR are arbitrary rings; $[\alpha]$ is a share generated by secret sharing of $\alpha$, with $\alpha$ being an arbitrary vector or arbitrary permutation; $m_0$ and $m_1$ are integers greater than or equal to 1; $k_0 \in F_k^{m0}$ is a vector of a key of a first table; $v_0 \in F_v^{m0}$ is a vector of an attribute value of the first table; $k_1 \in F_k^{m1}$ is a vector of a key of a second table; $V_1 \in F_v^{m1}$ is a vector of an attribute value of the second table; and $\pi_0$ and $\pi_1$ are predetermined permutations with lengths of $m_0$ and $m_1$, respectively, the secure joining method comprising:

a secure joining information generation step in which a plurality of secure joining information generation circuitries use a share $[k_0]$ of the vector $k_0$, a share $[k_1]$ of the vector $k_1$, a share $[\pi_0]$ of the permutation $\pi_0$, and a share $[\pi_1]$ of the permutation $\pi_1$ to generate: a share $[\pi_0(\sigma_0^{-1})]$ of a vector $\pi_0(\sigma_0^{-1})$ which is generated by application of the permutation $\pi_0$ to an inverse permutation $\sigma_0^{-1}$ of a permutation $\sigma_0$, where permutation of each vector of the first table with the permutation $\sigma_0$ causes records for keys common to the first table and the second table to move to a head side; a share $[\pi_1(\sigma_1^{-1})]$ of a vector $\pi_1(\sigma_1^{-1})$ which is generated by application of the permutation $\pi_1$ to an inverse permutation $\sigma_1^{-1}$ of a permutation $\sigma_1$, where permutation of each vector of the second table with the permutation $\sigma_1$ causes records for keys common to the first table and the second table to move to the head side; a share $[g_0]$ of a vector $g_0$ which is formed from a value $g_{0,i}$ indicating whether the ith record of the first table is a record for a key that is common to the first table and the second table; and a share $[g_1]$ of a vector $g_1$ which is formed from a value $g_{1,i}$ indicating whether the ith record of the second table is a record for a key that is common to the first table and the second table;

a filtering step in which a plurality of filtering circuitries use the share $[g_1]$, the share $[k_1]$ of the vector $k_1$, and the share $[V_1]$ of the vector $v_1$ to generate a modified second table in which if $g_{1,i}=1$, the ith element of the key of the second table is set to a predefined value $u_{1,k}$ indicating null and the ith element of the attribute of the second table is set to a predefined value $u_{1,v}$ indicating null, where $g_{1,i}$ is the ith element of the vector $g_1$;

a fifth permutation application step in which a plurality of fifth permutation application circuitries use the share $[k_0]$ of the vector $k_0$, a share $[V_0]$ of the vector $v_0$, a share $[k_1']$ of $k_1'$, which is a vector of the key of the modified second table, a share $[V_1']$ of $v_1'$, which is a vector of the attribute value of the modified second table, the share $[\pi_0]$ of the permutation $\pi_0$, the share $[\pi_1]$ of the permutation $\pi_1$, the share $[\pi_0(\sigma_0^{-1})]$, and the share $[\pi_1(\sigma_1^{-1})]$ to calculate a share $[k_0']$ of a vector $k_0'=(\pi_0(\sigma_0^{-1}))^{-1}(\pi_0(k_0))$, a share $[v_0']$ of a vector $V_0'=(\pi_0(\sigma_0^{-1}))^{-1}(\pi_0(V_0))$, a share $[k_1'']$ of a vector $k_1''=(\pi_1(\sigma_1^{-1}))^{-1}(\pi_1(k_1'))$, and a share $[V_1'']$ of a vector $v_1''=(\pi_1(\sigma_1^{-1}))^{-1}(\pi_1(V_1'))$; and a second joined table generation step in which a plurality of second joined table generation circuitries use the share $[k_0']$, the share $[V_0']$, the share $[k_1'']$, and the share $[V_1'']$ to generate, when $m_0<m_1$, a joined table which joins the vector $k_0'$, the vector $V_0'$, a vector generated by extracting first $m_0$ elements of the vector $k_1''$, and a vector generated by extracting first $m_0$ elements of the vector $v_1''$, and to generate, when $m_0>m_1$, a joined table which joins the vector $k_0'$, the vector $V_0'$, a vector generated by adding $m_0>m_1$ elements being a predefined value $u_k$ indicating null to the vector $k_1''$, and a vector generated by adding $m_0-m_1$ elements being a predefined value $u_v$ indicating null to the vector $v_1''$.

10. A secure joining method, where $F_k$ and $F_v$ are arbitrary rings; $[\alpha]$ is a share generated by secret sharing of $\alpha$, with $\alpha$ being an arbitrary vector or arbitrary permutation; $m_0$ and $m_1$ are integers greater than or equal to 1; $k_0 \in F_k^{m0}$ is a vector of a key of a first table; $v_0 \in F_v^{m0}$ is a vector of an attribute value of the first table: $k_1 \in F_k^{m1}$ is a vector of a key of a second table: $v_1 \in F_v^{m1}$ is a vector of an attribute value of the second table; and $\pi_0$ and $\pi_1$ are predetermined permutations with lengths of $m_0$ and $m_1$, respectively, the secure joining method comprising:

a secure joining information generation step in which a plurality of secure joining information generation circuitries use a share $[k_0]$ of the vector $k_0$, a share $[k_1]$ of the vector $k_1$, a share $[\pi_0]$ of the permutation $\pi_0$, and a share $[\pi_1]$ of the permutation $\pi_1$ to generate: a share $[\pi_0(\sigma_0^{-1})]$ of a vector $\pi_0(\sigma_0^{-1})$ which is generated by application of the permutation $\pi_0$ to an inverse permutation $\sigma_0^{-1}$ of a permutation $\sigma_0$, where permutation of each vector of the first table with the permutation $\sigma_0$ causes records for keys common to the first table and the second table to move to a head side; a share $[\pi_1(\sigma_1^{-1})]$ of a vector $\pi_1(\sigma_1^{-1})$ which is generated by application of the permutation $\pi_1$ to an inverse permutation $\sigma_1^{-1}$ of a permutation $\sigma_1$, where permutation of each vector of the second table with the permutation $\sigma_1$ causes records for keys common to the first table and the second table to move to the head side: a share $[g_0]$ of a vector $g_0$ which is formed from a value $g_{0,i}$ indicating whether the ith record of the first table is a record for a key that is common to the first table and the second table; and a share $[g_1]$ of a vector $g_1$ which is formed from a value $g_{1,i}$ indicating whether the ith record of the second table is a record for a key that is common to the first table and the second table;

a fourth permutation application step in which a plurality of fourth permutation application circuitries use the share $[k_0]$ of the vector $k_0$, a share $[V_0]$ of the vector $v_0$, the share $[k_1]$ of the vector $k_1$, and a share $[V_1]$ of the vector $v_1$ to calculate a share $[k_0']$ of a vector $k_0'=(\pi_0(\sigma_0^{-1}))^{-1}(\pi_0(k_0)))$, a share $[V_0']$ of a vector $V_0'=(\pi_0(\sigma_0^{-1}))^{-1}(\pi_0(V_0))$, a share $[k_1']$ of a vector $k_1'=(\pi_1(\sigma_1^{-1}))^{-1}(\pi_1(k_1'))$, and a share $[V_1']$ of a vector $v_1'=(\pi_1(\sigma_1^{-1}))^{-1}(\pi_1(V_1'))$; and a third joined table generation step in which a plurality of third joined table generation circuitries use the share $[k_0']$, the share $[V_0']$, the share $[k_1']$, and the share $[V_1']$ to generate a joined table which joins a table (1) which joins a vector generated by extracting first c elements of the vector $k_0'$, a vector generated by extracting first c elements of the vector $V_0'$, a vector generated by extracting first c elements of the vector $k_1'$, and a vector generated by extracting first c elements of the vector $v_1'$, a table (2) which joins a vector generated by extracting remaining $m_0$-c elements of the vector $k_0'$, a vector generated by extracting remaining $m_0$-c elements of the vector $V_0'$, and a vector having a value corresponding to the attribute value of the second table set to a predefined value $u'_{1,v}$ indicating null, and a table (3) which joins a vector generated by extracting remaining $m_0$-c elements of the vector $v_0'$, a vector generated by extracting remaining $m_1$-c elements of the vector $v_1'$, and a vector having a value corresponding to the attribute value of the first table set to a predefined value $u'_{0,v}$ indicating null, where c is the number of 0 elements in the vector $g_0$ or the vector $g_1$.

11. One or more non-transitory computer readable media that store a program for causing one or more computers to perform the method according to any one of claims 7-10.

\* \* \* \* \*